US012561156B2

(12) United States Patent (10) Patent No.: US 12,561,156 B2
Gong et al. (45) Date of Patent: Feb. 24, 2026

(54) METHOD AND APPARATUS FOR MIGRATING A VIRTUAL MACHINE CONFIGURED WITH A PASS-THROUGH DEVICE

(71) Applicant: HUAWEI TECHNOLOGIES CO., LTD., Guangdong (CN)

(72) Inventors: Lei Gong, Hangzhou (CN); Zhichao Huang, Hangzhou (CN); Hongyang Yang, Nanjing (CN); Jinsong Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1090 days.

(21) Appl. No.: 17/564,994

(22) Filed: Dec. 29, 2021

(65) Prior Publication Data

US 2022/0121473 A1 Apr. 21, 2022

Related U.S. Application Data

(63) Continuation of application No. PCT/CN2020/094202, filed on Jun. 3, 2020.

(30) Foreign Application Priority Data

Jun. 29, 2019 (CN) ........................ 201910581208.X

(51) Int. Cl.
*G06F 9/455* (2018.01)
(52) U.S. Cl.
CPC .. *G06F 9/45558* (2013.01); *G06F 2009/4557* (2013.01)
(58) Field of Classification Search
CPC ......... G06F 9/45558; G06F 2009/4557; G06F 2009/45579
See application file for complete search history.

(56) References Cited

U.S. PATENT DOCUMENTS 9,201,612 B1 * 12/2015 Vincent ................. G06F 9/4856
9,898,430 B2 * 2/2018 Davda ...................... G06F 13/24
(Continued)

FOREIGN PATENT DOCUMENTS

CN 101937438 B 1/2011
CN 102446119 A 5/2012
(Continued)

OTHER PUBLICATIONS

Extended European Search Report issued in European Application No. 20834696.5 on Jul. 12, 2022, 14 pages.
Hsu et al., "G-KVM: A Full GPU Virtualization on KVM," 2016 IEEE International Conference on Computer and Information Technology (CIT), Dec. 2016, 8 pages.
Xia et al., "A Survey of Live Migration Techniques for SR-IOV Device Pass-Through," 2018 IEEE 9th International Conference on Software Engineering and Service Science (ICSESS), Nov. 2018, 4 pages.
(Continued)

*Primary Examiner* — Jorge A Chu Joy-Davila
(74) *Attorney, Agent, or Firm* — Fish & Richardson P.C.

(57) ABSTRACT

This application provides a method for migrating a virtual machine and an apparatus. The method is applied to a source-end physical host, the source-end physical host includes a host machine operating system and a source-end virtual machine running in the host machine operating system, and the host machine operating system includes a physical function (PF) driver. According to the technical solutions of this application, memory consistency, before and after a migration process, of a virtual machine configured with a pass-through device can be ensured.

18 Claims, 9 Drawing Sheets

(56)                    References Cited

U.S. PATENT DOCUMENTS

| | | | | |
|---|---|---|---|---|
| 10,592,271 B1 * | 3/2020 | Sicron | ................. | G06F 9/45558 |
| 2012/0210203 A1 | 8/2012 | Kandekar et al. | | |
| 2013/0024598 A1 * | 1/2013 | Serebrin | ............. | G06F 12/1036 |
| | | | | 711/6 |
| 2017/0090965 A1 | 3/2017 | Tsirkin | | |
| 2019/0377594 A1 * | 12/2019 | Xie | .................... | G06F 9/45558 |

FOREIGN PATENT DOCUMENTS

| | | |
|---|---|---|
| CN | 102663023 B | 9/2012 |
| CN | 105760218 A | 7/2016 |
| CN | 105893114 A | 8/2016 |
| CN | 108205506 A | 6/2018 |
| CN | 108874506 A | 11/2018 |

OTHER PUBLICATIONS

Xu et al., "SRVM: Hypervisor Support for Live Migration with Passthrough SR-IOV Network Devices," ACM Sigplan Notices, vol. 51, No. 7, Mar. 2016, 13 pages.
PCT International Search Report and Written Opinion issued in International Application No. PCT/CN2020/094202 on Sep. 2, 2020, 18 pages (with English translation).
Office Action in Chinese Appln. No. 201910581208.X, dated May 8, 2023, 9 pages.

* cited by examiner

METHOD AND APPARATUS FOR MIGRATING A VIRTUAL MACHINE CONFIGURED WITH A PASS-THROUGH DEVICE

CROSS-REFERENCE TO RELATED APPLICATIONS

This application is a continuation of International Application No. PCT/CN2020/094202, filed on Jun. 3, 2020, which claims priority to Chinese Patent Application No. 201910581208. X, filed on Jun. 29, 2019. The disclosures of the aforementioned applications are hereby incorporated by reference in their entireties.

TECHNICAL FIELD

This application relates to the field of computer technologies, and specifically, to the field of virtual machine migration technologies, and in particular, to a method for migrating a virtual machine configured with a pass-through device and an apparatus.

BACKGROUND

A virtual machine (virtual machine, VM) is a complete computer system that is simulated by using software, has a complete hardware system function, and runs in an entirely isolated environment. The virtual machine usually runs on a host machine, and a plurality of virtual machines can run on each host machine. Virtual machine migration is a process of migrating a running virtual machine from a source host machine to a destination host machine. In a migration process, dirty page data of the virtual machine needs to be migrated from a source-end virtual machine to a destination-end virtual machine. The dirty page data is data written by a source-end pass-through device to the source-end virtual machine in a direct memory access (direct memory access, DMA) manner, to ensure memory consistency between the source-end virtual machine and the destination-end virtual machine.

In a conventional virtualization system architecture, the VM accesses a hardware resource of the host machine by using a virtual machine monitor (virtual machine monitor, VMM). In a virtual machine migration procedure, a memory of the source virtual machine is modified when a central processing unit (central processing unit, CPU) of the source host machine performs a write operation, and the source host machine performs a memory write protection mechanism by enabling an extended page table (extended page table, EPT), to mark a dirty page. For example, when migration of the source VM starts, all memory pages of the source VM are set to a write protection mode. When the CPU performs the write operation on the memory, a write protection exception is triggered, and the CPU marks the dirty page and records dirty page information.

Compared with the conventional virtualization system architecture, to achieve ultimate performance, in the current technology, a pass-through device may be configured for the virtual machine, and the virtual machine may directly access the pass-through device to achieve a high throughput and a low latency, and in addition, overheads of a virtualization layer can be reduced, and resource utilization can be improved. However, when the pass-through device of the virtual machine accesses the memory of the virtual machine through direct memory access, because the pass-through device can directly modify the memory of the virtual machine without using the CPU, the memory write protection mechanism may not be triggered, and memory consistency between the source-end virtual machine and the destination-end virtual machine in live migration cannot be ensured, thereby reducing performance of virtual machine migration.

SUMMARY

This application provides a method and an apparatus for migrating a virtual machine, to ensure memory consistency, before and after a migration process (a source-end virtual machine and a destination-end virtual machine), of a virtual machine configured with a pass-through device, thereby improving performance of virtual machine migration.

According to a first aspect, a method for migrating a virtual machine is provided, where the method is applied to a source-end physical host, the source-end physical host includes a host machine operating system and a source-end virtual machine running in the host machine operating system, the host machine operating system includes a physical function PF driver, data processed by the source-end virtual machine is transmitted by using a source-end pass-through device, and the method is used to migrate the source-end virtual machine to a destination-end virtual machine, and includes: The source-end virtual machine sends a first instruction to the source-end pass-through device by using the PF driver, where the first instruction is used to instruct the source-end pass-through device to record a storage address of dirty page data, and the dirty page data is data written by the source-end pass-through device to the source-end virtual machine in a direct memory access DMA manner; the source-end virtual machine obtains the storage address of the dirty page data of the source-end pass-through device; and the source-end virtual machine sends to-be-migrated data to the destination-end virtual machine, where the to-be-migrated data includes the dirty page data of the source-end virtual machine.

The dirty page data may be data written by the source-end pass-through device to a memory of the source-end virtual machine in the DMA manner. The storage address of the dirty page data may be a memory address of the data, and may also be referred to as dirty page information.

Based on the foregoing technical solution, when live migration needs to be performed for the source-end virtual machine, the source-end virtual machine may send the first instruction to any source-end pass-through device that is straight through to the source-end virtual machine, to instruct the source-end pass-through device to mark a memory address of data when writing the data to the source-end virtual machine in the DMA manner. Further, the source-end virtual machine may obtain the marked memory address from the source-end pass-through device, obtain dirty page data based on the marked memory address, and send the dirty page data to a destination end. In the foregoing technical solution, a problem that a CPU of a physical host cannot obtain a storage address of dirty page data in a scenario in which the source-end pass-through device directly modifies a memory of a virtual machine in the DMA manner without using the CPU can be resolved. Based on the foregoing technical solution, memory consistency, before and after a migration process, of a virtual machine configured with a pass-through device can be ensured, and performance of virtual machine migration is improved.

The foregoing DMA access manner is a high-speed data transmission operation, and allows data to be directly read and written between an external device and a memory. The entire data transmission operation is performed under the control of a DMA controller. DMA control logic may include both a CPU and a DMA control interface logical chip. A DMA controller of an embedded system is built in a processor chip. During DMA transmission, the DMA controller directly controls a bus, and the CPU hands over a bus control right to the DMA controller. After DMA transmission ends, the DMA controller immediately hands over the bus control right to the CPU. One complete DMA data transmission process may include four steps: a DMA request, a DMA response, DMA transmission, and a DMA end. DMA transmission means that after the DMA controller obtains the bus control right, the CPU is immediately suspended or performs only an internal operation, and the DMA controller outputs a read/write command to directly control a RAM to perform DMA transmission with an I/O interface. Under the control of the DMA controller, data is directly transferred between the memory and the external device, and the CPU does not need to participate in a transferring process.

In a possible implementation, the source-end pass-through device is connected to a root complex (root complex, RC) in the source-end physical host by using a peripheral component interconnect express PCIe bus, to implement DMA access to the source-end virtual machine running on the source-end physical host. The RC is used to connect a processor and a memory subsystem to a PCI express switching structure including one or more switching devices.

With reference to the first aspect, in some possible implementations, that the source-end virtual machine sends a first instruction to the source-end pass-through device by using the PF driver includes: The source-end virtual machine sends the first instruction to the PF driver, and the PF driver sends the first instruction to the source-end pass-through device.

In the technical solution of this application, the source-end virtual machine may send a migration instruction to the PF driver, and the PF driver transparently transmits the migration instruction to the source-end pass-through device. The migration instruction may be used to instruct the source-end pass-through device to perform a corresponding migration operation, and the migration instruction may include the first instruction. For example, the migration instruction may include a save instruction, a dirty page synchronization instruction, a suspend instruction, a start instruction, and a dirty page marking disabling instruction.

In a possible implementation, the source-end pass-through device may be a PF device, and the source-end virtual machine may send the migration instruction to the PF device by using the PF driver.

Based on the foregoing technical solution, the source-end virtual machine may send the migration instruction to the source-end pass-through device by using the PF driver, to migrate the virtual machine configured with the pass-through device.

With reference to the first aspect, in some possible implementations, that the source-end virtual machine sends a first instruction to the source-end pass-through device by using the PF driver includes: The PF driver writes the first instruction to reserved storage space, where the reserved storage space is used by the source-end pass-through device to obtain the first instruction, so that the source-end pass-through device obtains the first instruction from the reserved storage space.

It should be understood that the PF driver may send the migration instruction to the source-end pass-through device through a PF channel, and the PF channel may be a logical concept. In an implementation, the PF channel may be the reserved storage space. The PF driver writes, to the reserved storage space, the received migration instruction sent by the source-end virtual machine, and the source-end pass-through device may obtain, by detecting the reserved storage space, the migration instruction sent by the source-end virtual machine. The migration instruction may include the first instruction.

In a possible implementation, the reserved storage space may be a reserved memory that is allocated to the PF driver and that is accessed in the DMA manner.

Based on the foregoing technical solution, the migration instruction sent by the source-end virtual machine to the source-end pass-through device may be carried in the reserved storage space, to ensure memory consistency, before and after the migration process, of the virtual machine configured with the pass-through device, thereby improving performance of virtual machine migration.

With reference to the first aspect, in some possible implementations, the method further includes: The PF driver sends an address of the reserved storage space to the source-end pass-through device by using a register of the source-end pass-through device.

It should be understood that, at a virtual machine migration preparation phase, the source-end virtual machine needs to send a memory of the reserved storage space to the source-end pass-through device, to ensure that the source-end pass-through device can receive the migration instruction sent by the source-end virtual machine.

With reference to the first aspect, in some possible implementations, that the source-end virtual machine sends a first instruction to the source-end pass-through device by using the PF driver includes: The PF driver writes the first instruction to a reserved bit of PCIe configuration space of the source-end pass-through device, where the PCIe configuration space is used by the source-end pass-through device to obtain the instruction, so that the source-end pass-through device obtains the first instruction from the reserved bit of the PCIe configuration space.

The PCIe configuration space of the source-end pass-through device may be a series of register clusters of the source-end pass-through device. The source-end virtual machine may send the migration instruction to the source-end pass-through device by using the reserved bit of the PCIe configuration space.

The reserved bit of the PCIe configuration space may be a reserved bit of existing PCIe configuration space of the source-end pass-through device.

Based on the foregoing technical solution, after receiving the migration instruction sent by the source-end virtual machine, the PF driver may send the migration instruction to the source-end pass-through device by using the PCIe configuration space. For example, the first instruction may be sent to the source-end pass-through device by using the reserved bit of the PCIe configuration space to instruct the source-end pass-through device to record the storage address of the dirty page data, to ensure memory consistency, before and after the migration process, of the virtual machine configured with the pass-through device, thereby improving performance of virtual machine migration.

With reference to the first aspect, in some possible implementations, that the source-end virtual machine sends a first instruction to the source-end pass-through device by using the PF driver includes: The PF driver writes the first instruction to preconfigured PCIe configuration space of the source-end pass-through device, where the preconfigured PCIe configuration space is used by the source-end pass-through device to obtain the first instruction, so that the source-end pass-through device obtains the first instruction from the preconfigured PCIe configuration space.

The preconfigured PCIe configuration space may be PCIe configuration space that is configured for the source-end pass-through device to transmit the migration instruction.

Based on the foregoing technical solution, after receiving the migration instruction sent by the source-end virtual machine, the PF driver may send the migration instruction to the source-end pass-through device by using the PCIe configuration space. For example, the first instruction may be sent to the source-end pass-through device by using the preconfigured PCIe configuration space to instruct the source-end pass-through device to record the storage address of the dirty page data, to ensure memory consistency, before and after the migration process, of the virtual machine configured with the pass-through device, thereby improving performance of virtual machine migration.

With reference to the first aspect, in some possible implementations, a plurality of virtual pass-through devices run on the source-end pass-through device, and the method further includes: allocating first storage space to the PF driver, where the first storage space is used to store a storage address that is of dirty page data and that is recorded by each of the plurality of virtual pass-through devices.

In a possible implementation, a plurality of virtual pass-through devices may run on the source-end pass-through device. The virtual pass-through device is a virtual device running on the source-end pass-through device. The source-end pass-through device may be alternatively any one of a plurality of virtual pass-through devices running on a hardware device, in other words, a first pass-through source-end pass-through device may be a VF device.

The first storage space may be storage space that is allocated to the PF driver and that is accessed in the DMA manner, and the storage space may be used to synchronize storage addresses of dirty page data that are recorded by the plurality of virtual pass-through devices. The first storage space may be storage space based on a granularity of the virtual machine, in other words, the first storage space may be used to synchronize storage addresses of dirty page data that are recorded by a plurality of source-end pass-through devices that are straight through to the source-end virtual machine.

With reference to the first aspect, in some possible implementations, that the source-end virtual machine obtains the address of the dirty page data of the source-end pass-through device includes: The source-end virtual machine sends a dirty page synchronization instruction to the source-end pass-through device by using the PF driver, where the dirty page instruction includes a first address in the first storage space, and the dirty page synchronization instruction is used to instruct the source-end pass-through device to synchronize the storage address of the dirty page data to a storage location that is in the first storage space and that is indicated by the first address; and the source-end virtual machine reads the storage address of the dirty page data from the first storage space based on the first address.

Based on the foregoing technical solution, the source-end virtual machine may send the dirty page synchronization instruction to the source-end pass-through device by using the PF driver, where the dirty page synchronization instruction carries the first address, and the source-end pass-through device may synchronize the recorded storage address of the dirty page data to the storage location that is in the first storage space and that is indicated by the first address. Based on the technical solution of this application, in a process of migrating the virtual machine configured with the pass-through device, a CPU resource of the source-end physical host does not need to be consumed to obtain the storage address of the dirty page data, thereby saving resources and improving performance of virtual machine migration.

In a possible implementation, the dirty page synchronization instruction is an instruction that is periodically sent.

It should be understood that the source-end pass-through device may continuously write data to the memory of the source-end virtual machine in the DMA manner. Before the source-end pass-through device stops running, dirty page information is information that is continuously updated. Therefore, the source-end virtual machine may periodically send the dirty page synchronization instruction to the source-end pass-through device to obtain a storage address of the dirty page data that is continuously updated.

With reference to the first aspect, in some possible implementations, second storage space is allocated to the PF driver, where the second storage space is used to store status information of each of the plurality of virtual pass-through devices, the status information is status information of each virtual pass-through device at a moment at which running stops, and the status information includes information about a register of each virtual pass-through device and information about a memory descriptor.

It should be noted herein that the information about the register may be status information of the register when the source-end pass-through device stops running, for example, may be information such as indexes of a receiving queue, a sending queue, and a control queue of a register in the source-end pass-through device. The information about the memory descriptor may be status information of receiving or sending data on a data plane at a moment at which the source-end pass-through device stops running. The source-end virtual machine obtains status information of the source-end pass-through device, and sends the status information to the destination-end virtual machine, so that status (for example, a register status and an interrupt status) consistency between the source-end pass-through device and a destination-end pass-through device before and after a process of migrating the virtual machine configured with the pass-through device can be ensured, thereby improving performance of virtual machine migration.

With reference to the first aspect, in some possible implementations, the method further includes: The source-end virtual machine sends a save instruction to the source-end pass-through device by using the PF driver, where the save instruction includes a second address in the second storage space, and the save instruction is used to instruct the source-end pass-through device to save the status information to a storage location that is in the second storage space and that is indicated by the second address; and the source-end virtual machine obtains the status information from the storage location that is in the second storage space and that corresponds to the second address.

Based on the foregoing technical solution, the source-end virtual machine may send the save instruction to the source-end pass-through device by using the PF driver, where the save instruction carries the second address, and the source-end pass-through device may save the status information of the source-end pass-through device to the storage location that is in the second storage space and that is indicated by the second address. Based on the technical solution of this application, status consistency between the source-end pass-through device and the destination-end pass-through device before and after the process of migrating the virtual machine configured with the pass-through device can be ensured, thereby improving performance of virtual machine migration.

With reference to the first aspect, in some possible implementations, the plurality of virtual pass-through devices include a first virtual pass-through device and a second virtual pass-through device, and the method further includes: After receiving a feedback instruction that is of a second instruction and that is sent by the PF driver, the source-end virtual machine sends a third instruction to the second virtual pass-through device by using the PF driver, where the feedback instruction indicates that the PF driver has sent the second instruction to the first virtual pass-through device.

In a possible implementation, the second instruction and the third instruction may be any migration instruction, for example, may be any one of the first instruction, the dirty page synchronization instruction, and the save instruction.

In the technical solution of this application, after the source-end virtual machine sends the first instruction to the first virtual pass-through device by using the PF driver, the PF driver may directly send a feedback instruction of the first instruction, so that the source-end virtual machine may send the migration instruction to the second virtual pass-through device. In other words, the source-end virtual machine can send the migration instruction to the second virtual pass-through device without a need to wait for the first virtual pass-through device to complete execution of the first instruction, in other words, the source-end virtual machine may immediately send the migration instruction to the second virtual pass-through device after receiving the feedback instruction of the first instruction, thereby reducing duration of virtual machine migration and improving performance of virtual machine migration.

With reference to the first aspect, in some possible implementations, that the source-end virtual machine sends to-be-migrated data to the destination-end virtual machine includes: The source-end virtual machine sends the to-be-migrated data to the destination-end virtual machine in an iterative memory copy manner, where the to-be-migrated data includes the dirty page data of the source-end virtual machine.

According to a second aspect, a method for migrating a virtual machine is provided, including: A source-end pass-through device receives a first instruction sent by a source-end virtual machine by using a physical function PF driver, where the first instruction is used to instruct the source-end pass-through device to record a storage address of dirty page data, the dirty page data is data written by the source-end pass-through device to the source-end virtual machine in a direct memory access DMA manner, the PF driver runs in a host operating system of a source-end physical host, and the source-end physical host further includes the source-end virtual machine running in the host operating system; the source-end pass-through device records the storage address of the dirty page data according to the first instruction; and the source-end pass-through device sends the storage address of the dirty page data to the source-end virtual machine.

The dirty page data may be data written by the source-end pass-through device to a memory of the source-end virtual machine in the DMA manner. The storage address of the dirty page data may be a memory address of the data, and may also be referred to as dirty page information.

Based on the foregoing technical solution, when live migration needs to be performed for the source-end virtual machine, the source-end virtual machine may send the first instruction to any source-end pass-through device that is straight through to the source-end virtual machine, to instruct the source-end pass-through device to mark a memory address of data when writing the data to the source-end virtual machine in the DMA manner. Further, the source-end virtual machine may obtain the marked memory address from the source-end pass-through device, obtain dirty page data based on the marked memory address, and send the dirty page data to a destination end. In the foregoing technical solution, a problem that a CPU of a physical host cannot obtain a storage address of dirty page data in a scenario in which the source-end pass-through device directly modifies a memory of a virtual machine in the DMA manner without using the CPU can be resolved. Based on the foregoing technical solution, memory consistency, before and after a migration process, of a virtual machine configured with a pass-through device can be ensured, and performance of virtual machine migration is improved.

The foregoing DMA access manner is a high-speed data transmission operation, and allows data to be directly read and written between an external device and a memory. The entire data transmission operation is performed under the control of a DMA controller. DMA control logic may include both a CPU and a DMA control interface logical chip. A DMA controller of an embedded system is built in a processor chip. During DMA transmission, the DMA controller directly controls a bus, and the CPU hands over a bus control right to the DMA controller. After DMA transmission ends, the DMA controller immediately hands over the bus control right to the CPU. One complete DMA data transmission process may include four steps: a DMA request, a DMA response, DMA transmission, and a DMA end. DMA transmission means that after the DMA controller obtains the bus control right, the CPU is immediately suspended or performs only an internal operation, and the DMA controller outputs a read/write command to directly control a RAM to perform DMA transmission with an I/O interface. Under the control of the DMA controller, data is directly transferred between the memory and the external device, and the CPU does not need to participate in a transferring process.

In a possible implementation, the source-end pass-through device is connected to a root complex (root complex, RC) in the source-end physical host by using a PCIe bus, to implement DMA access to the source-end virtual machine running on the source-end physical host. The RC is used to connect a processor and a memory subsystem to a PCI express switching structure including one or more switching devices.

With reference to the second aspect, in some possible implementations, that a source-end pass-through device receives a first instruction sent by a source-end virtual machine by using a physical function PF driver includes: The source-end pass-through device receives the first instruction sent by the PF driver, where the first instruction is an instruction that is transparently transmitted by the source-end virtual machine to the source-end pass-through device by using the PF driver.

In the technical solution of this application, the source-end pass-through device may receive a migration instruction sent by the source-end virtual machine by using the PF driver, in other words, the PF driver transparently transmits the migration instruction to the source-end pass-through device. The migration instruction may be used to instruct the source-end pass-through device to perform a corresponding migration operation, and the migration instruction may include the first instruction. For example, the migration instruction may include a save instruction, a dirty page synchronization instruction, a suspend instruction, a start instruction, and a dirty page marking disabling instruction.

In a possible implementation, the source-end pass-through device may be a PF device, and the source-end virtual machine may send the migration instruction to the PF device by using the PF driver.

Based on the foregoing technical solution, the source-end virtual machine may send the migration instruction to the source-end pass-through device by using the PF driver, to migrate the virtual machine configured with the pass-through device.

With reference to the second aspect, in some possible implementations, that a source-end pass-through device receives a first instruction sent by a source-end virtual machine by using a physical function PF driver includes: The source-end pass-through device obtains an address of reserved storage space, and obtains, based on the address of the reserved storage space, the first instruction carried in the reserved storage space, where the first instruction is an instruction written by the PF driver to the reserved storage space, so that the source-end pass-through device obtains the first instruction from the reserved storage space.

It should be understood that the PF driver may send the migration instruction to the source-end pass-through device through a PF channel, and the PF channel may be a logical concept. In an implementation, the PF channel may be the reserved storage space. The PF driver writes, to the reserved storage space, the received migration instruction sent by the source-end virtual machine, and the source-end pass-through device may obtain, by detecting the reserved storage space, the migration instruction sent by the source-end virtual machine. The migration instruction may include the first instruction.

In a possible implementation, the reserved storage space may be a reserved memory that is allocated to the PF driver and that is accessed in the DMA manner.

Based on the foregoing technical solution, the migration instruction sent by the source-end virtual machine to the source-end pass-through device may be carried in the reserved storage space, to ensure memory consistency, before and after the migration process, of the virtual machine configured with the pass-through device, thereby improving performance of virtual machine migration.

With reference to the second aspect, in some possible implementations, that a source-end pass-through device receives a first instruction sent by a source-end virtual machine by using a physical function PF driver includes: The source-end pass-through device obtains the first instruction carried in a reserved bit of PCIe configuration space of the source-end pass-through device, where the first instruction is an instruction written by the PF driver to the reserved bit, so that the source-end pass-through device obtains the first instruction from the reserved bit of the PCIe configuration space.

The PCIe configuration space of the source-end pass-through device may be a series of register clusters of the source-end pass-through device. The source-end virtual machine may send the migration instruction to the source-end pass-through device by using the reserved bit of the PCIe configuration space.

The reserved bit of the PCIe configuration space may be a reserved bit of existing PCIe configuration space of the source-end pass-through device.

Based on the foregoing technical solution, after receiving the migration instruction sent by the source-end virtual machine, the PF driver may send the migration instruction to the source-end pass-through device by using the PCIe configuration space. For example, the first instruction may be sent to the source-end pass-through device by using the reserved bit of the PCIe configuration space to instruct the source-end pass-through device to record the storage address of the dirty page data, to ensure memory consistency, before and after the migration process, of the virtual machine configured with the pass-through device, thereby improving performance of virtual machine migration.

With reference to the second aspect, in some possible implementations, that a source-end pass-through device receives a first instruction sent by a source-end virtual machine by using a physical function PF driver includes: The source-end pass-through device obtains the first instruction carried in preconfigured PCIe configuration space of the source-end pass-through device, where the first instruction is an instruction written by the PF driver to the preconfigured PCIe configuration space, so that the source-end pass-through device obtains the first instruction from the preconfigured PCIe configuration space.

The preconfigured PCIe configuration space may be PCIe configuration space that is configured for the source-end pass-through device to transmit the migration instruction.

Based on the foregoing technical solution, after receiving the migration instruction sent by the source-end virtual machine by using the PF driver, the PF driver may send the migration instruction to the source-end pass-through device by using the PCIe configuration space. For example, the first instruction may be sent to the source-end pass-through device by using the preconfigured PCIe configuration space to instruct the source-end pass-through device to record the storage address of the dirty page data, to ensure memory consistency, before and after the migration process, of the virtual machine configured with the pass-through device, thereby improving performance of virtual machine migration.

With reference to the second aspect, in some possible implementations, that the source-end pass-through device sends the storage address of the dirty page data to the source-end virtual machine includes: The source-end pass-through device receives a dirty page synchronization instruction sent by the source-end virtual machine by using the PF driver, where the dirty page instruction includes a first address in first storage space, the first storage space represents storage space that is allocated to the PF driver and that is used to synchronize the storage address of the dirty page data, and the dirty page synchronization instruction is used to instruct the source-end pass-through device to synchronize the storage address of the dirty page data to a storage location that is in the first storage space and that is indicated by the first address; and the source-end pass-through device synchronizes, according to the dirty page synchronization instruction, the storage address of the dirty page data to the storage location that is in the first storage space and that is indicated by the first address.

Based on the foregoing technical solution, the source-end virtual machine may send the dirty page synchronization instruction to the source-end pass-through device by using the PF driver, where the dirty page synchronization instruction carries the first address, and the source-end pass-through device may synchronize the recorded storage address of the dirty page data to the storage location that is in the first storage space and that is indicated by the first address. Based on the technical solution of this application, in a process of migrating the virtual machine configured with the pass-through device, a CPU resource of the source-end physical host does not need to be consumed to obtain the storage address of the dirty page data, thereby saving resources and improving performance of virtual machine migration.

In a possible implementation, the dirty page synchronization instruction is an instruction that is periodically sent.

It should be understood that the source-end pass-through device may continuously write data to the memory of the source-end virtual machine in the DMA manner. Before the source-end pass-through device stops running, dirty page information is information that is continuously updated. Therefore, the source-end virtual machine may periodically send the dirty page synchronization instruction to the source-end pass-through device to obtain a storage address of the dirty page data that is continuously updated.

With reference to the second aspect, in some possible implementations, a plurality of virtual pass-through devices run on the source-end pass-through device, and the first storage space is used to store a storage address that is of dirty page data and that is recorded by each of the plurality of virtual pass-through devices.

In a possible implementation, a plurality of virtual pass-through devices may run on the source-end pass-through device. The virtual pass-through device is a virtual device running on the source-end pass-through device. The source-end pass-through device may be alternatively any one of a plurality of virtual pass-through devices running on a hardware device, in other words, a first pass-through source-end pass-through device may be a VF device.

The first storage space may be storage space that is allocated to the PF driver and that is accessed in the DMA manner, and the storage space may be used to synchronize storage addresses of dirty page data that are recorded by the plurality of virtual pass-through devices. The first storage space may be storage space based on a granularity of the virtual machine, in other words, the first storage space may be used to synchronize storage addresses of dirty page data that are recorded by a plurality of source-end pass-through devices that are straight through to the source-end virtual machine.

With reference to the second aspect, in some possible implementations, the method further includes: The source-end pass-through device receives a save instruction sent by the source-end virtual machine by using the PF driver, where the save instruction includes a second address in second storage space, the second storage space represents storage space that is allocated to the PF driver and that is used to store status information of the source-end pass-through device at a moment at which running stops, the save instruction is used to instruct the source-end pass-through device to save the status information to a storage location that is in the second storage space and that is indicated by the second address, and the status information includes information about a register of the source-end pass-through device and information about a memory descriptor; and the source-end pass-through device saves, according to the save instruction, the status information to the storage location that is in the second storage space and that is indicated by the second address.

Based on the foregoing technical solution, the source-end virtual machine may send the save instruction to the source-end pass-through device by using the PF driver, where the save instruction carries the second address, and the source-end pass-through device may save the status information of the source-end pass-through device to the storage location that is in the second storage space and that is indicated by the second address. Based on the technical solution of this application, status consistency between the source-end pass-through device and a destination-end pass-through device before and after the process of migrating the virtual machine configured with the pass-through device can be ensured, thereby improving performance of virtual machine migration.

With reference to the second aspect, in some possible implementations, a plurality of virtual pass-through devices run on the source-end pass-through device, and the second storage space is used to store status information of each of the plurality of virtual pass-through devices.

It should be noted herein that the information about the register may be status information of the register when the source-end pass-through device stops running, for example, may be information such as indexes of a receiving queue, a sending queue, and a control queue of a register in the source-end pass-through device. The information about the memory descriptor may be status information of receiving or sending data on a data plane at a moment at which the source-end pass-through device stops running. The source-end virtual machine obtains status information of the source-end pass-through device, and sends the status information to the destination-end virtual machine, so that status (for example, a register status and an interrupt status) consistency between the source-end pass-through device and the destination-end pass-through device before and after a process of migrating the virtual machine configured with the pass-through device can be ensured, thereby improving performance of virtual machine migration.

According to a third aspect, a physical host is provided, including a source-end virtual machine module and a physical function PF driver module, where the source-end virtual machine module is configured to send a first instruction to a source-end pass-through device by using the PF driver module, the first instruction is used to instruct the source-end pass-through device to record a storage address of dirty page data, and the dirty page data is data written by the source-end pass-through device to the source-end virtual machine module in a direct memory access DMA manner; and the source-end virtual machine module is further configured to obtain the storage address that is of the dirty page data and that is recorded by the source-end pass-through device, and send to-be-migrated data to a destination-end virtual machine, where the to-be-migrated data includes the dirty page data of the source-end virtual machine module.

With reference to the third aspect, in some possible implementations, the source-end virtual machine module is specifically configured to send the first instruction to the PF driver module, and the PF driver module is specifically configured to send the first instruction to the source-end pass-through device.

With reference to the third aspect, in some possible implementations, the PF driver module is specifically configured to write the first instruction to reserved storage space, where the reserved storage space is used by the source-end pass-through device to obtain the first instruction, so that the source-end pass-through device obtains the first instruction from the reserved storage space.

With reference to the third aspect, in some possible implementations, the PF driver module is further configured to send an address of the reserved storage space to the source-end pass-through device by using a register of the source-end pass-through device, so that the source-end pass-through device obtains the first instruction from the reserved storage space.

With reference to the third aspect, in some possible implementations, the PF driver module is specifically configured to write the first instruction to a reserved bit of PCIe configuration space of the source-end pass-through device, where the PCIe configuration space is used by the source-end pass-through device to obtain the instruction, so that the source-end pass-through device obtains the first instruction from the reserved bit of the PCIe configuration space.

With reference to the third aspect, in some possible implementations, the PF driver module is specifically configured to write the first instruction to preconfigured PCIe configuration space of the source-end pass-through device, where the preconfigured PCIe configuration space is used by the source-end pass-through device to obtain the first instruction, so that the source-end pass-through device obtains the first instruction from the preconfigured PCIe configuration space.

With reference to the third aspect, in some possible implementations, a plurality of virtual pass-through devices run on the source-end pass-through device, the physical host further includes a control module, and the control module is configured to allocate first storage space to the PF driver module, where the first storage space is used to store a storage address that is of dirty page data and that is recorded by each of the plurality of virtual pass-through devices.

With reference to the third aspect, in some possible implementations, the source-end virtual machine module is further configured to: send a dirty page synchronization instruction to the source-end pass-through device by using the PF driver module, where the dirty page instruction includes a first address in the first storage space, and the dirty page synchronization instruction is used to instruct the source-end pass-through device to synchronize the storage address of the dirty page data to a storage location that is in the first storage space and that is indicated by the first address; and read the storage address of the dirty page data from the first storage space based on the first address.

With reference to the third aspect, in some possible implementations, the control module is further configured to allocate second storage space to the PF driver module, where the second storage space is used to store status information of each of the plurality of virtual pass-through devices, the status information is status information of each virtual pass-through device at a moment at which running stops, and the status information includes information about a register of each virtual pass-through device and information about a memory descriptor.

With reference to the third aspect, in some possible implementations, the source-end virtual machine module is further configured to: send a save instruction to the source-end pass-through device by using the PF driver module, where the save instruction includes a second address in the second storage space, and the save instruction is used to instruct the source-end pass-through device to save the status information to a storage location that is in the second storage space and that is indicated by the second address; and obtain the status information from the storage location that is in the second storage space and that corresponds to the second address.

With reference to the third aspect, in some possible implementations, the plurality of virtual pass-through devices include a first virtual pass-through device and a second virtual pass-through device, and the source-end virtual machine module is further configured to: after receiving a feedback instruction that is of a second instruction and that is sent by the PF driver module, send a third instruction to the second virtual pass-through device by using the PF driver module, where the feedback instruction indicates that the PF driver module has sent the second instruction to the first virtual pass-through device.

In a possible implementation, the second instruction and the third instruction may be any migration instruction, for example, may be any one of the first instruction, the dirty page synchronization instruction, and the save instruction.

According to a fourth aspect, a pass-through device is provided, including a communications module and a processing module, where the communications module is configured to receive a first instruction sent by a source-end virtual machine by using a physical function PF driver, where the first instruction is used to instruct the pass-through device to record a storage address of dirty page data, the dirty page data is data written by the pass-through device to the source-end virtual machine in a direct memory access DMA manner, the PF driver runs in a host operating system of a source-end physical host, and the source-end physical host further includes the source-end virtual machine running in the host operating system; the processing module is configured to record the storage address of the dirty page data according to the first instruction; and the communications module is further configured to send the storage address of the dirty page data to the source-end virtual machine.

It should be understood that the pass-through device may be a source-end pass-through device configured on the source-end virtual machine.

With reference to the fourth aspect, in some possible implementations, the communications module is specifically configured to receive the first instruction sent by the PF driver, where the first instruction is an instruction that is transparently transmitted by the source-end virtual machine to the pass-through device by using the PF driver.

With reference to the fourth aspect, in some possible implementations, the communications module is further configured to obtain, by the pass-through device, an address of reserved storage space; and the processing module is further configured to obtain, based on the address of the reserved storage space, the first instruction carried in the reserved storage space, where the first instruction is an instruction written by the PF driver to the reserved storage space, so that the pass-through device obtains the first instruction from the reserved storage space.

With reference to the fourth aspect, in some possible implementations, the communications module is specifically configured to obtain the first instruction carried in a reserved bit of PCIe configuration space of the pass-through device, where the first instruction is an instruction written by the PF driver to the reserved bit, so that the pass-through device obtains the first instruction from the reserved bit of the PCIe configuration space.

With reference to the fourth aspect, in some possible implementations, the communications module is specifically configured to obtain the first instruction carried in preconfigured PCIe configuration space of the pass-through device, where the first instruction is an instruction written by the PF driver to the preconfigured PCIe configuration space, so that the pass-through device obtains the first instruction from the preconfigured PCIe configuration space.

With reference to the fourth aspect, in some possible implementations, the communications module is further configured to receive a dirty page synchronization instruction sent by the source-end virtual machine by using the PF driver, where the dirty page instruction includes a first address in first storage space, the first storage space represents storage space that is allocated to the PF driver and that is used to synchronize the storage address of the dirty page data, and the dirty page synchronization instruction is used to instruct the pass-through device to synchronize the storage address of the dirty page data to a storage location that is in the first storage space and that is indicated by the first address; and the processing module is further configured to synchronize, according to the dirty page synchronization instruction, the storage address of the dirty page data to the storage location that is in the first storage space and that is indicated by the first address.

With reference to the fourth aspect, in some possible implementations, a plurality of virtual pass-through devices run on the pass-through device, and the first storage space is used to store a storage address that is of dirty page data and that is recorded by each of the plurality of virtual pass-through devices.

With reference to the fourth aspect, in some possible implementations, the communications module is further configured to receive a save instruction sent by the source-end virtual machine by using the PF driver, where the save instruction includes a second address in second storage space, the second storage space represents storage space that is allocated to the PF driver and that is used to store status information of the pass-through device at a moment at which running stops, the save instruction is used to instruct the pass-through device to save the status information to a storage location that is in the second storage space and that is indicated by the second address, and the status information includes information about a register of the pass-through device and information about a memory descriptor; and the processing module is further configured to save, according to the save instruction, the status information to the storage location that is in the second storage space and that is indicated by the second address.

With reference to the fourth aspect, in some possible implementations, a plurality of virtual pass-through devices run on the pass-through device, and the second storage space is used to store status information of each of the plurality of virtual pass-through devices.

According to a fifth aspect, a computer system is provided. The computer system includes a processor and a memory, the memory is configured to store a computer program, and the processor is configured to invoke the computer program to perform the method in the first aspect or the second aspect or any possible implementation of the first aspect or the second aspect.

The memory may be configured to store program code and data of the computer system. Therefore, the memory may be an internal storage unit of the processor, may be an external storage unit independent of the processor, or may be a part including an internal storage unit of the processor and an external storage unit independent of the processor.

The memory may include a volatile memory (volatile memory), such as a random access memory (random access memory, RAM); or the memory may include a non-volatile memory (non-volatile memory), such as a read-only memory (read-only memory, ROM), a flash memory (flash memory), a hard disk drive (hard disk drive, HDD), or a solid-state drive (solid-state drive, SSD); or the memory may include a combination of the foregoing types of memories. The memory may be configured to store a group of program code, so that the processor invokes the program code stored in the memory, to implement functions of a receiving module and/or the processing module in this embodiment of this application.

The processor may include one or more general-purpose processors, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in this application. Alternatively, the processor may be a combination for implementing a computing function, for example, a combination of a plurality of microprocessors, or a combination of a DSP and a microprocessor. The processor may be configured to run a program of a processing function in related program code. In other words, the processor may execute the program code to implement a function of the processing module. For the processing module, specifically refer to related descriptions in the third aspect.

It should be understood that the processor may be alternatively a set including a processor of at least one computing device. This is not specifically limited in this application.

In a possible implementation, the processor of the at least one computing device is jointly configured to run related program code, to implement functions of the virtual machine and the PF driver in the third aspect of this application.

In a possible implementation, the processor of the at least one computing device is jointly configured to run related program code, to implement functions of the modules in the fourth aspect of this application.

In another possible implementation, a processor of each computing device may be separately configured to run related program code, to implement functions of the virtual machine and the PF driver in the third aspect of this application.

In another possible implementation, a processor of each computing device may be separately configured to run related program code, to implement functions of the modules in the fourth aspect of this application.

A communications interface may be a wired interface (for example, an Ethernet interface) or a wireless interface (for example, a cellular network interface or a wireless local area network interface), and is configured to communicate with another module/device. For example, the communications interface in this embodiment of this application may be specifically configured to receive instruction data sent by an enterprise tenant or a tenant.

According to a sixth aspect, a computer system is provided, including the foregoing physical host and one or more pass-through devices.

According to a seventh aspect, a computer-readable medium is provided, where the computer-readable medium stores program code, and when the computer program code is run on a computer, the computer is enabled to perform the methods in the foregoing aspects.

According to an eighth aspect, a computer program product is provided, where the computer program product includes computer program code, and when the computer program code is run on a computer, the computer is enabled to perform the methods in the foregoing aspects.

DESCRIPTION OF EMBODIMENTS

The following describes technical solutions of this application with reference to the accompanying drawings.

First, some terms involved in this application are briefly described.

A virtual computer is a general name of running environments virtualized by software in all types of virtualized devices, and this concept includes a virtual machine and a container. Virtualization is a core technology of a cloud scenario. A hardware resource is virtualized and then shared by a plurality of users to use, so that the user can conveniently and flexibly use a physical resource on a premise of being securely isolated, and utilization of the physical resource can be greatly improved.

Figure 1:
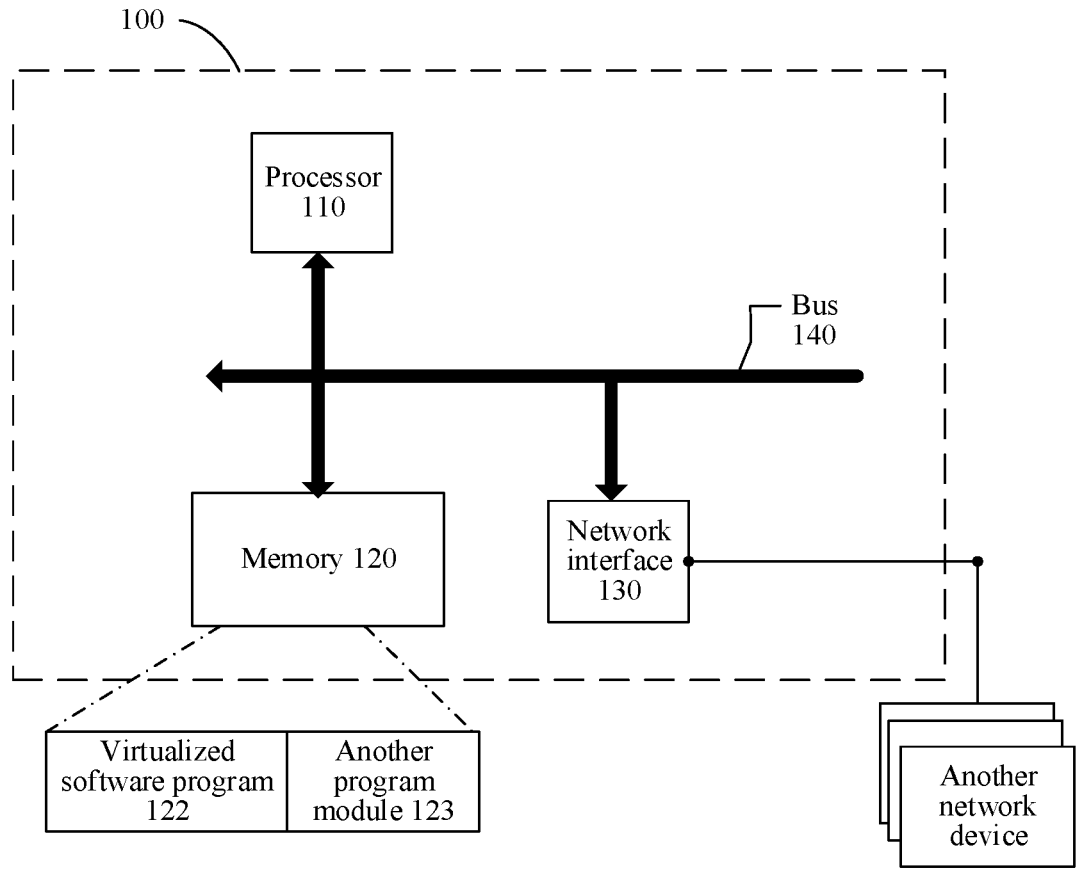
FIG. 1 is a schematic diagram of a hardware structure of a computer according to an embodiment of this application.

For example, FIG. 1 is a schematic diagram of a hardware structure of a computer according to an embodiment of this application.

As shown in FIG. 1, a hardware structure 100 of the computer may include components such as a processor 110, a memory 120, and a network interface 130 (also referred to as a network interface card or a network adapter). The processor 110 may be a single-core processor, or may be a multi-core processor. When the processor 110 is a multi-core processor, the method provided in this application may be run on one core, or may be distributed and run on different cores. There may be one or more processors 110, and types of a plurality of processors may be the same or different. Types of the processor include a CPU, a graphics processing unit (graphics processing unit, GPU), a microprocessor, a coprocessor, or the like. The network interface 130 may be configured to connect to another network device, including a wireless connection and a wired connection. The memory 120 includes a volatile memory and a non-volatile memory, and generally, the non-volatile memory stores a virtualized software program 122 and another program module 123. Virtualization of the hardware structure 100 after the virtualized software program 122 is read and run by the processor 110 includes creating a host machine layer, a plurality of virtual computers, and the like. After a software program for virtual machine migration provided in this application is read and run by the processor 110, various methods for migrating a virtual machine provided in the embodiments of this application are implemented. The software program provided in this application may be combined in the virtualized software program 122.

The foregoing components are connected by using a bus 140. There may be one or more buses 140. The bus 140 includes an advanced microcontroller bus architecture (advance microcontroller bus architecture, AMBA) bus, an industry standard architecture (industry standard architecture, ISA) bus, a micro channel architecture (micro channel architecture, MCA) bus, an extended ISA (extended-ISA) bus, a video electronics standards association (video electronics standards association, VESA) local bus, a peripheral component interconnect (peripheral component interconnect, PCI) bus, and the like.

Figure 2:
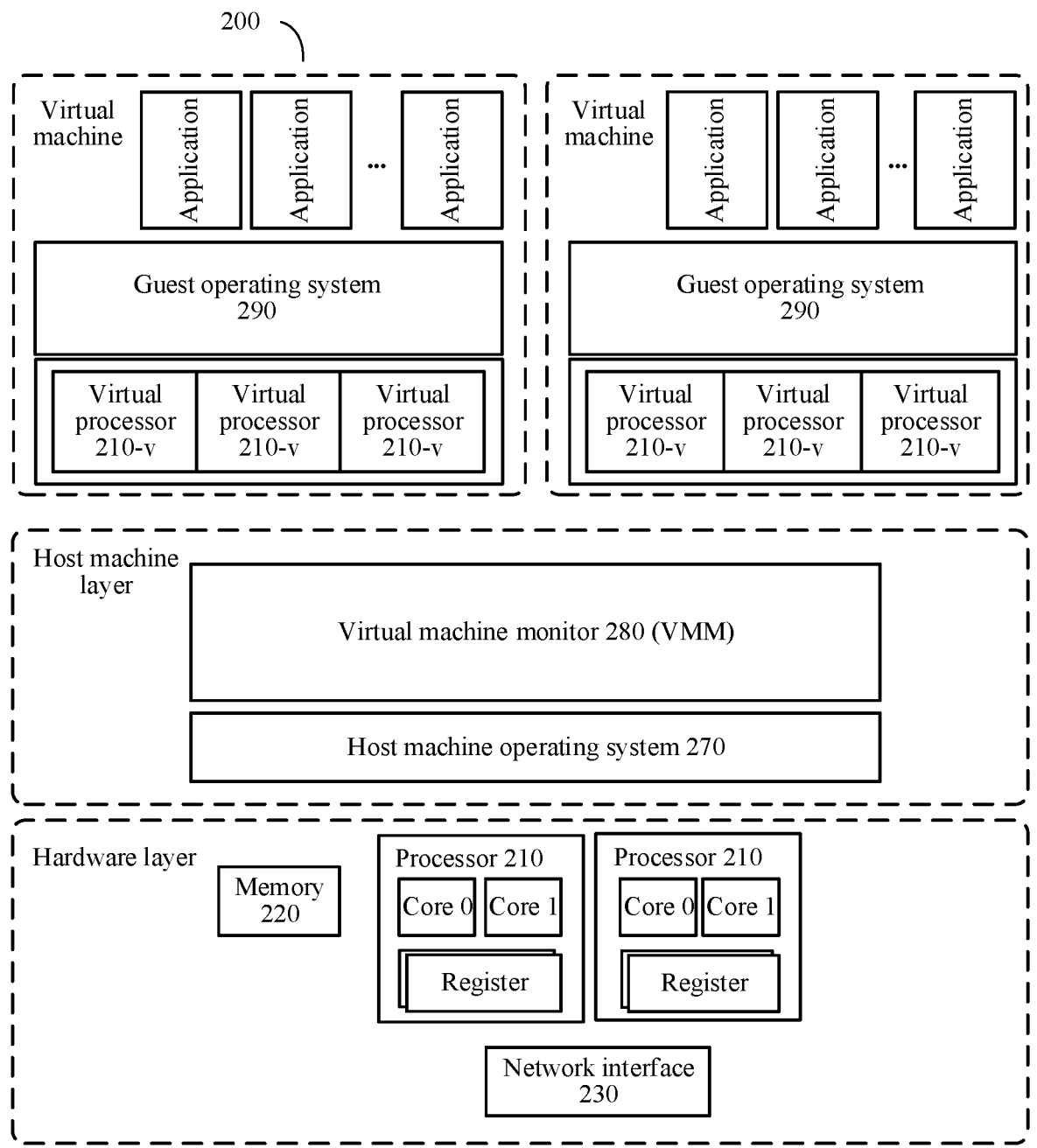
FIG. 2 is a schematic diagram of a structural diagram of a virtualized computer according to an embodiment of this application.

FIG. 2 is a schematic diagram of a structural diagram of a virtualized computer 200 according to an embodiment of this application. The virtualized computer 200 may include a hardware layer, a host machine layer, and a virtualization layer, and the virtualization layer includes two virtual machines. In descriptions of FIG. 2, for example, the hardware layer includes hardware such as two processors 210, a memory 220, and a network interface 230. In another embodiment, there may be more or fewer processors 210 and more or fewer virtual machines.

In some other embodiments, the virtual machine may include a container (container), and the container is equivalent to an application. In some other embodiments, the virtualization layer may be implemented by a lightweight virtualization technology, for example, a libOS, and the libOS is a runtime library that can provide a function similar to an operating system and that can be linked with the application for running, so that all resources necessary for running of the application are managed by the application instead of the operating system. For example, the libOS is unikernel, OSv, or dune, and may be considered as a lightweight virtual computer. One libOS usually includes one application. The entire libOS is one or more libraries, and is linked with the application to form a single-address space image. In this embodiment of this application, a virtual machine implemented by using a conventional virtualization technology is usually used as an example. For another type of virtualization architecture, refer to implementation of the virtual machine.

It should be noted that the computer is used as an example for description in this embodiment. However, the method provided in this application is not limited to this device, and all types of virtualized devices may be used.

The processor 210 may include one or more physical cores (the physical core is sometimes referred to as a core for short in this application).

The "physical core" represents a minimum processing unit in this application. As shown in FIG. 2, each processor in this embodiment has a plurality of registers and two physical cores: a core 0 and a core 1. In some other embodiments, the processor may include more or fewer cores, and a quantity of cores included in each processor may also be different.

A host machine operating system 270 and a virtual machine monitor 280 (virtual machine monitor, VMM) are deployed in a host machine, and the VMM 280 is equivalent to a hypervisor or another type of virtual monitoring apparatus in another virtualization architecture. The VMM 280 may be deployed inside the host machine operating system 270, or may be deployed separately from the host machine operating system 270. The VMM 280 is responsible for managing one or more virtual machines running on the VMM 280.

A virtual machine (virtual machine, VM) may include a virtual hardware layer, a guest operating system 290, and a plurality of applications. The virtual hardware layer includes virtual hardware such as a virtual memory (not shown in the figure) and a virtual processor 210-$v$. As shown in FIG. 2, this embodiment includes two virtual machines, and each virtual machine includes three virtual processors 210-$v$. The virtual processor 210-$v$ is implemented by a combination of software and hardware. Running of the virtual processor 210-$v$ is actually implemented by the physical core by reading and running a software program. For example, one physical core reads the software program and runs the software program in a specific mode (for example, a non-Root mode of x86) of hardware-assisted virtualization of the physical core to implement one virtual processor 210-$v$. Therefore, the virtual processor 210-$v$ needs to be scheduled to a specific physical core.

The virtual processor 210-$v$ and the physical core may be in a binding relationship, to be specific, if a virtual processor 210-$v$ may always run on a specific physical core and cannot be scheduled to run on another physical core, the virtual processor is bound to a core; and if a virtual processor 210-$v$ can be scheduled to run on different physical cores based on a requirement, the virtual processor is not bound to a core.

In this embodiment, a total quantity of virtual processors 210-$v$ is 6, and is greater than a quantity 4 of physical cores. This scenario is referred to as physical processor overallocation. In a case of physical processor overallocation, a plurality of virtual processors share a same physical core in a time segment manner or another manner. This physical core is referred to as a non-exclusive core. Certainly, the non-exclusive core may also appear in a case of non-overallocation. If a physical core is bound to a virtual processor and is not shared by another virtual processor, the physical core is an exclusive core.

As a virtual monitoring apparatus, the VMM 280 is responsible for scheduling a virtual processor 210-$v$ of each VM. For example, a kernel-based virtual machine (kernel-based virtual machine, KVM) is a typical VMM. Scheduling of the virtual processor 210-$v$ by the VMM 280 includes swapping in the virtual processor and swapping out the virtual processor. First, the VMM 280 creates and initializes an object of a VM, and then creates three virtual processors 210-$v$ for the VM. When one VM includes a plurality of virtual processors 210-$v$, generally, one virtual processor 210-$v$ is a primary virtual processor, and the other virtual processors 210-$v$ are subordinate virtual processors. The virtual processor 210-$v$ is not associated with a physical core at the beginning of being created. The VMM 280 schedules a specific virtual processor 210-$v$ to a specific physical core based on a policy, and this is referred to as swapping in the virtual processor. The VMM 280 suspends the virtual processor 210-$v$ or migrates the virtual processor 210-$v$ out of the physical core, and this is referred to as swapping out the virtual processor. In a core binding scenario, a virtual processor is scheduled to a same core each time the virtual processor is switched in. In a non-core binding scenario, before being scheduled, the VMM 280 may determine, based on a current running status of a system and/or a scheduling algorithm, a specific core to which the virtual processor 210-$v$ is to be scheduled.

It should be noted that a virtual processor 210-$v$ may not immediately trap into running after being swapped in. Before the virtual processor 210-$v$ is swapped in and does not trap into running, a host machine (specifically, a VMM) may further implement some configuration on the virtual processor 210-$v$, and then the virtual processor 210-$v$ traps into a guest mode.

Some terms involved in this application are briefly described below.

1. Virtual Machine

A virtual machine is one or more virtual computers that are simulated on a physical computer by using software. These virtual machines run in an entirely isolated environment, working like real computers. A guest operating system (guest operating system, guest OS) may be installed on the virtual machine, and one or more applications run on the guest operating system. The virtual machine may further access a network resource. An application running on the virtual machine is working like a real computer.

2. Host Machine (Host) Layer

A host machine layer is used as a management layer to manage and allocate a hardware resource, present a virtual hardware platform for a virtual machine, schedule and isolate the virtual machine, and the like. In some implementations, the host machine layer includes a host machine operating system and a virtual monitoring apparatus, for example, a VMM or a hypervisor. The virtual monitoring apparatus may be deployed inside a host machine operating system, or may be deployed outside a host machine operating system. In some other implementations, the "host machine layer" may further include one privileged virtual machine (for example, a virtualized architecture Xen). The virtual hardware platform provides various hardware resources such as a virtual processor, a virtual memory, a virtual disk, and a virtual network interface card for each virtual computer running on the virtual hardware platform. The virtual computer runs on a virtual hardware platform prepared by the host machine layer for the virtual computer. In this application, the host machine layer is sometimes referred to as a host machine.

3. Hardware Layer

A hardware layer is a hardware platform that runs in a virtualized environment. The hardware layer may include a plurality of types of hardware, for example, a hardware layer of a specific physical computer may include a processor and a memory, and may further include an interrupt controller, a network interface card (network interface card, NIC), an input/output (input/output I/O) device, and the like.

4. Libos (Library Operating System)

As an operating system provided by a lightweight virtualization technology, a libOS is a running library that can provide a function similar to the operating system and is linked with an application for running, so that all resources required for running the application are managed by the application instead of the operating system. For example, the libOS is unikernel, OSv, or dune. The libOS may be considered as a lightweight virtual computer.

5. Physical Processor

A physical processor may be sometimes referred to as a "processor" for short. In this application, the physical processor is a physical processing unit, and may be specifically a minimum processing unit, namely, a physical core in this application. In some embodiments, the physical processor may be alternatively a processing unit including a plurality of physical cores.

6. Virtual Processor

The virtual processor is a representation of a physical processing unit such as a virtual CPU (virtual central processing unit, vCPU) that is provided for a virtual computer in a shared or fragmented manner in a virtualization technology. One virtual computer may be served by one or more virtual processors. When there are a plurality of virtual processors, usually, one virtual processor is a primary virtual processor, and another virtual processor is a subordinate virtual processor.

It should be understood that the virtual computer is equivalent to an independent computer. Therefore, that the virtual computer executes an action may also be considered as that a virtual processor executes the action. The virtual processor is implemented by software. Therefore, that the virtual processor executes an action is actually that a physical processor or a physical core run by the virtual processor executes the action. In a plurality of embodiments of this application, the foregoing expressions are selectively used to follow a technical expression habit of a current scenario.

7. Single-Root Input/Output Virtualization (Single-Root Input/Output Virtualization, SR-IOV)

In an SR-IOV technology, a plurality of virtual PCIe devices may be virtualized on a peripheral component interconnect express (peripheral component interconnect express, PCIe) device. The virtual PCIe device can only be configured and managed by using an original physical PCIe device. Each virtual PCIe device may have an independent DMA. In this way, the virtual machine may directly access the physical PCIe device by using the PCIe device without requiring intervention of a VMM. A network interface card supporting the SR-IOV is used as an example. Each virtual PCIe device corresponds to one virtual network interface card. A packet is directly exchanged between the virtual PCIe device and a corresponding virtual network interface card, and participation of the VMM is not required, thereby reducing VMM overheads and improving virtual machine performance.

Two function types are abstracted in the SR-IOV for a user to use, and are separately referred to as a physical function (physical function, PF) and a virtual function (virtual function, VF). Generally, a network interface card supporting the SR-IOV technology provides a PF. The PF includes a function structure of the SR-IOV. The user manages an SR-IOV function of the network interface card by operating the PF. The VF is a function type associated with the PF. The PF is responsible for creating and maintaining the VF. Each PF may have a plurality of VFs associated with the PF, and provide the VF for a virtual machine to use. A physical resource provided by the PF is shared by the VFs.

8. Live Migration of a Virtual Machine

Live migration of a virtual machine means a process of moving a running virtual machine from an original host to a destination host, and a service deployed on an interrupt virtual machine has no perception in a migration process.

For example, a virtual machine runs on a host, and when a fault occurs on the host or resource allocation is not balanced (for example, load is too heavy or load is too light), normal running of a virtual machine service may be ensured by migrating the virtual machine.

Current main live migration application scenarios include but are not limited to the following several types:

Scenario 1: When a host is faulty or overloaded, a running virtual machine may be migrated to another host to avoid service interruption, ensure normal running of a service, and implement elastic expansion.

Scenario 2: When load of most hosts is excessively light, virtual machines may be migrated and integrated, to reduce a quantity of hosts, improve resource utilization, save energy, reduce emissions, and reduce costs.

Scenario 3: When a host needs to upgrade and maintain hardware or software, to avoid affecting a virtual machine service on the host, a virtual machine needs to be migrated to another physical host in advance. In actual application, a case in which the virtual machine needs to be migrated may exist. For example, when it is found, through monitoring, that load on a specific physical machine is excessively heavy, VM performance is degraded, and contention for a central processing unit of a VM is excessively intense, a migration operation needs to be performed, to migrate a corresponding VM to another physical machine that still has spare resources. To ensure that a service is not interrupted in a migration process, a live migration (live migration) technology of the virtual machine is usually used, in other words, the virtual machine is stored/restored. The live migration technology means that a running status of the entire virtual machine is entirely stored, and can be quickly restored to an original hardware platform or even a different hardware platform. After being restored, the virtual machine still runs smoothly, and a user does not perceive any difference.

For example, a virtual machine migration process may be online migration, to be specific, migration is performed while ensuring normal running of a service on a source-end virtual machine. The source-end virtual machine may copy memory data to another physical host while running. When there is an extremely small amount of memory data that needs to be copied, the source-end virtual machine may stop running and copy a remaining small part of the memory data to the another physical host at one time. After copying is completed, a destination virtual machine may be re-activated on the another physical host, to implement online migration of the virtual machine.

In actual application, a case in which the virtual machine needs to be migrated may exist. For example, when it is found, through monitoring, that load on a specific physical machine is excessively heavy, VM performance is degraded, and contention for a central processing unit of a VM is excessively intense, a migration operation needs to be performed, to migrate a corresponding VM to another physical machine that still has spare resources. To ensure that a service is not interrupted in a migration process, a live migration (live migration) technology of the virtual machine is usually used, in other words, the virtual machine is stored/restored. The live migration technology means that a running status of the entire virtual machine is entirely stored, and can be quickly restored to an original hardware platform or even a different hardware platform. After being restored, the virtual machine still runs smoothly, and a user does not perceive any difference.

Figure 3:
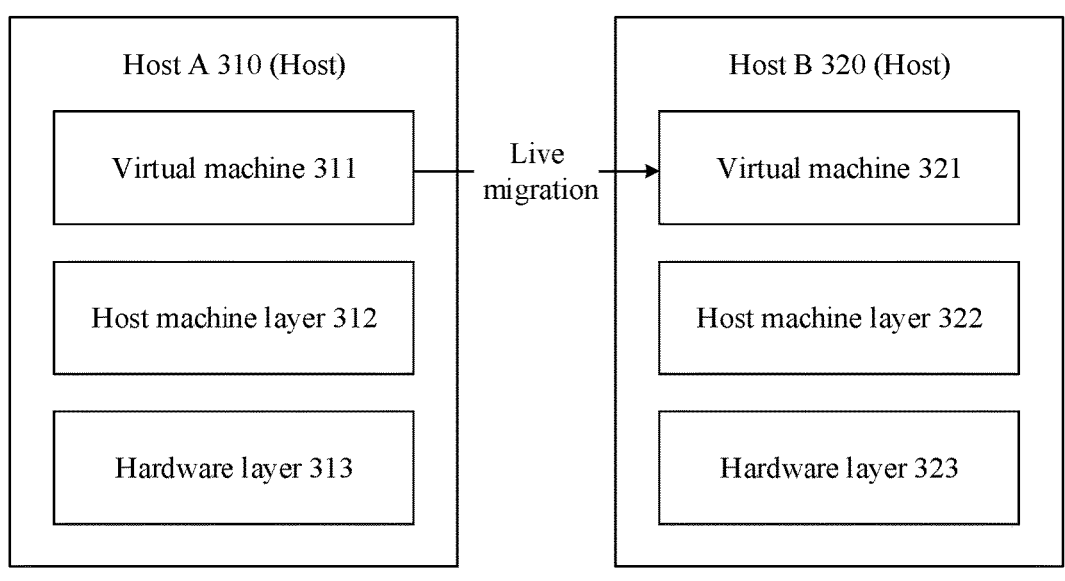
FIG. 3 is a schematic diagram of live migration according to an embodiment of this application.

For example, FIG. 3 is a schematic diagram of live migration according to an embodiment of this application. As shown in FIG. 3, a host 310 and a host 320 are included. A schematic structural diagram of the host 310 and the host 320 may be shown in FIG. 2. The host 310 may include one or more virtual machines 311, a host machine layer 312, and a hardware layer 313. The host 320 may include one or more virtual machines 321, a host machine layer 322, and a hardware layer 323. When there is the foregoing case in which live migration is required, the virtual machine in the host 310 may be migrated to the host 320, in other words, a running status of the entire virtual machine in the host 310 may be entirely stored, and can be quickly restored to the virtual machine 321 in the host 320 at the same time. After being restored, the virtual machine still runs smoothly, and the user does not perceive any difference.

9. Pass-Through Device of a Virtual Machine

To pursue ultimate performance, major cloud vendors may choose to configure a pass-through device for a virtual machine, and directly access the pass-through device by using the virtual machine, so that the virtual machine achieves performance close to a physical machine, and achieves virtualization performance of a high throughput and a low latency. In addition, overheads of a virtualization layer can be further reduced, and resource availability can be improved (for example, resources of a central processing unit of a host can be saved, and may be used to create more virtual machines). A public cloud may be a cloud that is provided by a third-party provider for a user and that can be used. The user can access a service by using the Internet. Current common public clouds include, for example, Hicloud, Alicloud, and an amazon web service (amazon web service, AWS). A private cloud may run on a public resource, but it can be ensured that resources between users are isolated, and the user can use the resource without being affected by another user.

A virtual machine pass-through technology means that a virtual machine is supported to bypass a hypervisor layer and directly access a physical I/O device, so that the virtual machine achieves performance close to a physical machine. An SR-IOV pass-through technology is a hardware-based virtualization solution. The virtual machine may be directly connected to a physical network interface card by using the SR-IOV technology, and the physical network interface card may be efficiently shared by a plurality of virtual machines. A customer can achieve I/O performance comparable to the physical host by using the SR-IOV pass-through technology.

Figure 4:
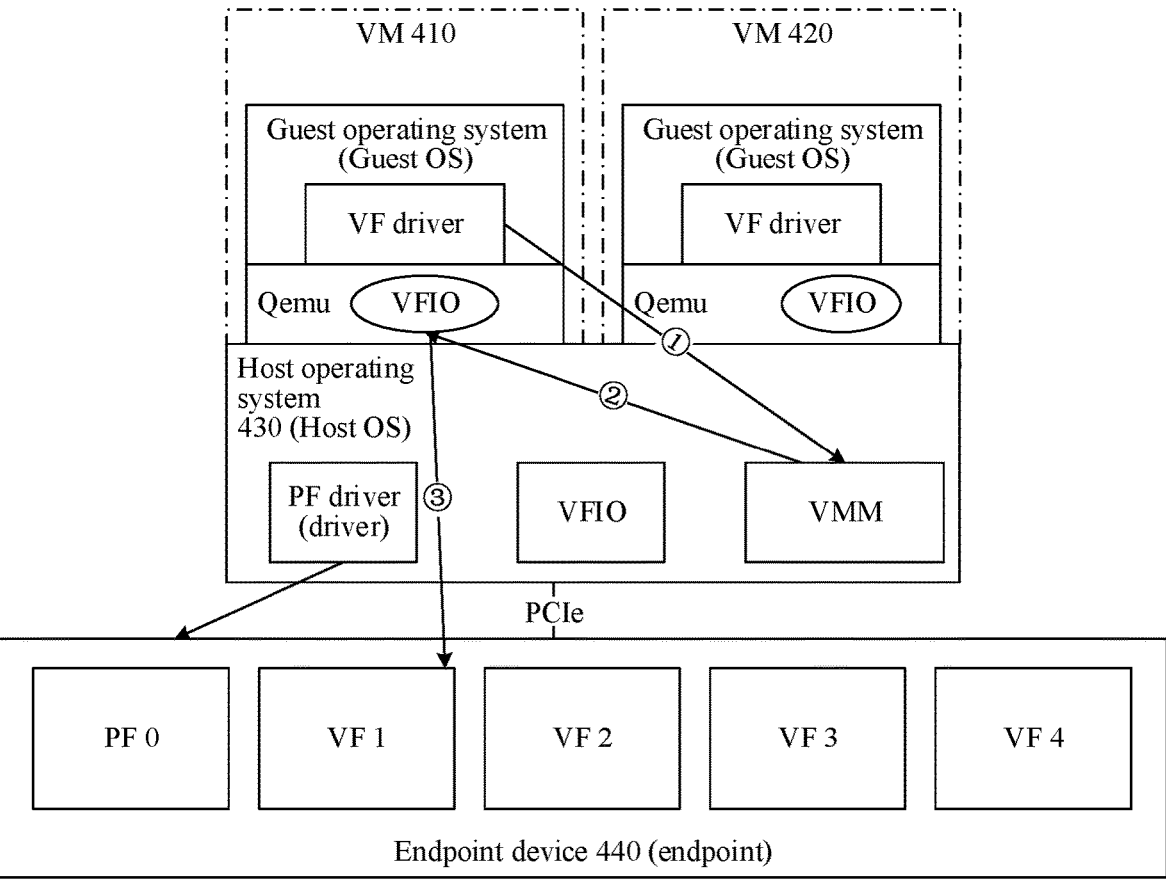
FIG. 4 is a schematic diagram of implementing a pass-through technology based on SR-IOV according to an embodiment of this application.

For example, FIG. 4 is a schematic diagram of implementing a pass-through technology based on SR-IOV according to an embodiment of this application.

As shown in FIG. 4, a VM 410, a VM 420, a host operating system 430, and an endpoint (endpoint, EP) device 440 are included. One PF and four VFs may be configured in the EP 440. A VF 1 and a VF 2 may be straight through to the VM1 410, a VF 3 may be straight through to the VM2 420, and a VF 4 is not allocated. The VM 410 and the VM 420 may include a Guest OS part that can be perceived by a user and a device emulator (quick emulator, Qemu) that cannot be perceived by the user. A corresponding VF driver may be loaded for a Guest OS inside the virtual machine, to access a VF device. Access to the VF device may be divided into control plane access (such as register setting and interrupt application) and data plane access (such as data sending and receiving of a network interface card). When a control plane performs access, the following steps are performed.

Step 1: A VF driver performs a write register operation and traps into a VMM.

Step 2: The VMM parses a trap instruction, and if it is found through parsing that the trap instruction is an IO instruction, forwards the instruction to a Qemu in a user mode for processing.

A virtualization system includes two modes: a host mode (host mode) and a guest mode (guest mode). When a virtual processor enters the guest mode, it is referred to as trapping (virtual). When the virtual processor leaves the guest mode, it is referred to as sinking (virtual). After the virtual processor sinks, a physical processor temporarily does not execute code of the virtual processor temporarily. Therefore, in this case, it may be understood as that the virtual processor is not running. For a physical processor, if a virtual processor running on the physical processor traps, it may be considered as that the physical processor is in the guest mode and runs code of the virtual processor. When the virtual processor running on the physical processor sinks into the host mode, it may be considered as that the physical processor is in the host mode and runs code related to a host machine, for example, a VMM.

Step 3: The Qemu accesses a corresponding VF register (through a PCIe link) based on a register address and length obtained through parsing.

When data plane access is performed in the schematic diagram of implementing a pass-through technology based on SR-IOV shown in FIG. 4, a VM may directly convert a specified virtual machine physical address (guest physical address, GPA) into a host physical address (host physical address, HPA) by using input-output memory management unit (input-output memory management unit, IOMMU) hardware, to perform data receiving/sending processing. Therefore, when performing data plane access, the VM does not need to trap into VMM processing, thereby reducing overheads and achieving an IO data plane of high performance.

10. Memory Dirty Page

A system may read data with relatively frequent read/write operations into a memory, to improve a read/write speed. This process may be referred to as caching. For example, in a Linux operating system, a page is used as a unit for caching. When a write operation modifies data in a cache, the page is marked by a kernel as a memory dirty page, and the memory dirty page may also be referred to as a dirty page. In other words, data corresponding to a hard disk in data in the memory changes, and a changed data page is referred to as the dirty page.

It should be understood that data means data received or sent on a data plane. A page is a storage unit of the memory. For example, a page may generally have a size of 4K, 2 M, or 1 G. A data plane is a concept relative to a control plane. The data plane is mainly used to store a service flow of IO and network IO. The control plane may be used to deliver an instruction of a control class or a configuration class. For example, a migration instruction may be the instruction of the control class.

In a conventional live migration technology, a central processing unit (central processing unit, CPU) in a server usually initiates modification of a memory of a virtual machine, and obtains dirty page information based on a mechanism such as extended page tables (extended page tables, EPT) memory write protection.

For example, when virtual machine migration starts, all memory pages in the virtual machine may be set to a write protection mode. When any memory write operation occurs, a write protection exception is triggered, and the CPU perceives the write protection exception, so that the CPU can record an address of a dirty page and mark a memory as dirty.

However, for a virtual machine that implements the pass-through technology based on SR-IOV, a pass-through device may access a memory of the virtual machine in a direct memory access DMA manner. In other words, the pass-through device may directly perform a write operation on the memory of the virtual machine by using an IOMMU without a need to modify the memory of the virtual machine by using a CPU. In this case, dirty page information in the virtual machine cannot be obtained by using the conventional live migration technology, and status consistency of the pass-through device before and after live migration cannot be implemented.

In view of this, embodiments of this application provide a method and an apparatus for migrating a virtual machine. After a virtual machine migration procedure is started, a source-end virtual machine may send a first instruction for indicating a source-end pass-through device to record a storage address of dirty page data, where dirty page data is data written by the source-end pass-through device to the source-end virtual machine in a DMA manner. After receiving the first instruction, when writing data to the source-end virtual machine in the DMA manner, the source-end pass-through device marks a storage address of the data. The source-end virtual machine may obtain the storage address that is of the dirty page data and that is recorded in the source-end pass-through device, and send the dirty page data to a destination-end virtual machine, to ensure memory consistency between the source-end virtual machine and the destination-end virtual machine before and after a process of migrating a virtual machine configured with a pass-through device, thereby improving performance of virtual machine migration.

Figure 5:
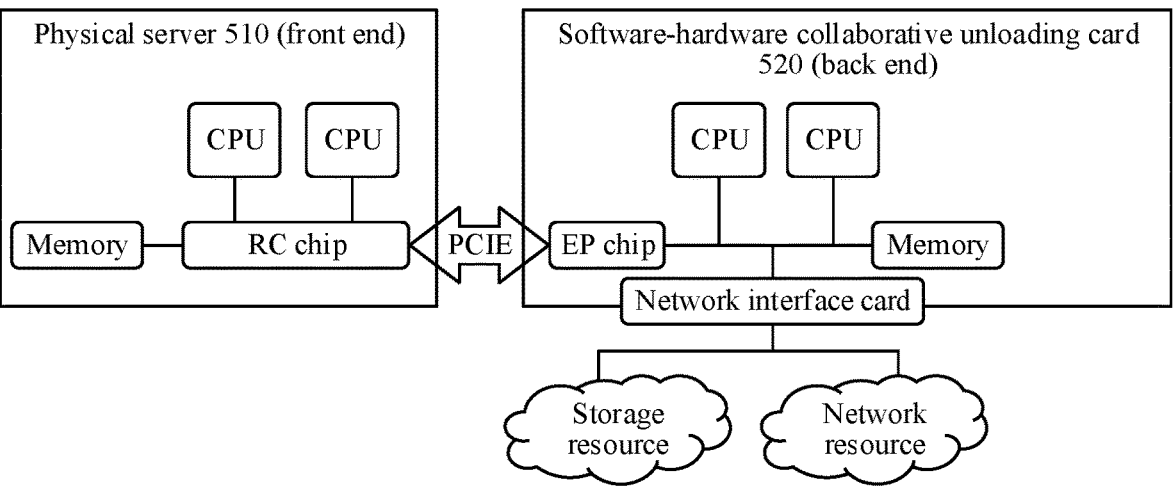
FIG. 5 is a schematic diagram of a system architecture applicable to an embodiment of this application.
Figure 6:
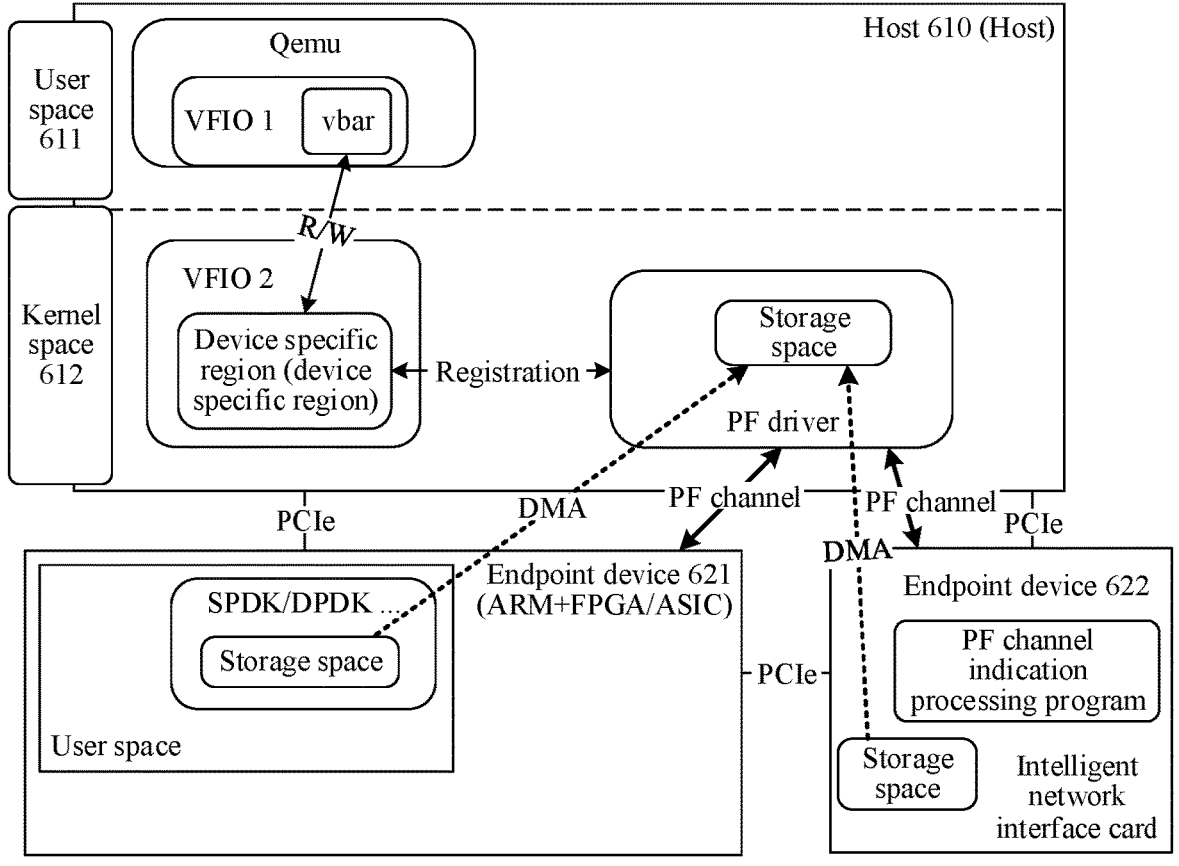
FIG. 6 is a schematic diagram of a system architecture applicable to an embodiment of this application.

To facilitate understanding of the embodiments of this application, the following first describes in detail, with reference to FIG. 5 and FIG. 6, a schematic diagram of a system architecture applicable to a method for migrating a virtual machine provided in the embodiments of this application.

FIG. 5 is a schematic diagram of a system architecture 500 applicable to a live migration method for a virtual machine according to an embodiment of this application.

As shown in FIG. 5, the system architecture may include a front-end physical server 510 and a back-end software-hardware collaborative unloading card 520. A computing resource of the physical server 510 and a computing resource of the software-hardware collaborative unloading card 520 may be a CPU and a memory. In a hardware system shown in FIG. 5, the software-hardware collaborative unloading card 520 may be interconnected to the physical server 510 by using a PCIe protocol. Specifically, a hardware layer of the physical server 510 may include a CPU, a memory, and a root complex (root complex, RC) chip. The RC chip is a hardware interface defined in a PCIe specification. The hardware interface is responsible for sending a PCIe message of the physical server 510 to an external device (for example, the software-hardware collaborative unloading card 520), and may further receive a PCIe message sent by the external device (for example, the software-hardware collaborative unloading card 520). A hardware layer of the software-hardware collaborative unloading card 520 may include a CPU, a memory, and an endpoint (end point, EP) chip. The EP chip is a hardware interface defined in the PCIe specification. The EP chip is used as a peripheral interface of the software-hardware collaborative unloading card 520, and is responsible for sending a PCIe message to the physical server 510, or may further receive a PCIe message sent by the physical server 510.

A specific implementation of the RC chip and a specific implementation of the EP chip are not limited in this embodiment of this application, and any RC chip and any EP chip that are implemented in compliance with the PCIe specification can be used.

It should be noted that the software-hardware collaborative unloading card 520 may be further connected by using a network interface card storage resource and a network resource, so that the software-hardware collaborative unloading card 520 sends, to the storage resource and the network resource for processing, an IO request delivered by a VM in the physical server 510.

In a software system shown in FIG. 5, a VMM may run on the physical server 510. By using a computing virtualization technology, a CPU and a memory resource in the physical server 510 are provided for a virtual machine to use, and the VMM may further pass through, to a software layer of the software-hardware collaborative unloading card 520 for processing, an IO request delivered by the virtual machine.

Specific architectures in the physical server and the EP chip are described in detail below with reference to FIG. 6. FIG. 6 is a schematic diagram of a system architecture 600 applicable to a live migration method for a virtual machine according to an embodiment of this application.

As shown in the figure, the system architecture 600 may include a host 610 and one or more endpoint (Endpoint, EP) devices (for example, an endpoint device 621 and an endpoint device 622). User space 611 and kernel space 612 may be run on the host 610.

It should be understood that, in this embodiment of this application, an EP may be a device that meets a PCIe specification. For example, the EP may be a device with a computing resource and a storage resource. For example, the EP may be an ASCI chip, an intelligent network interface card, or a PFGA chip.

For example, the host operating system in FIG. 2 is a Linux operating system. As shown in FIG. 6, the Linux system may be divided into two parts: One part is core software, namely, a kernel (kernel space) that is also referred to as kernel space; and the other part is a common application program, and this part may also be referred to as user space (user space). Code in the user space may be run at a relatively low privilege level. Only some system resources that are allowed to be used by the code can be seen, the code cannot use some specific system functions and cannot directly access the kernel space and a hardware device, and there are some other specific use restrictions. When the user space and the kernel space are placed in this asymmetric access mechanism, good security is achieved, so that snooping of a malicious user can be resisted, and damage caused by a user program of poor quality can be prevented, thereby making system running more stable and reliable.

As shown in the system architecture 600 shown in FIG. 6, the system 600 includes a host 610 and an endpoint device EP (for example, an EP 621 and an EP 622), and the host 610 may include user space 611 and kernel space 612. The user space 611 may include a virtual operating system emulator Qemu, the Qemu is a virtualized emulator implemented by software only, and the Qemu enables a guest OS to interact with a device such as a hard disk, a network interface card, a CPU, a CD-ROM, an audio device, and a USB on a physical host. In the system architecture shown in FIG. 6, the Qemu may receive a live migration instruction sent by a user, and send the live migration instruction from user space of a physical host to the kernel space 612. The Qemu may include a virtual read/write function (virtual function input/ output, VFIO) and a virtual base address register (virtual base address register, vBar). The VFIO in the Qemu is configured to invoke various interfaces provided by kernel space VFIO 2, to complete presentation and a function of a pass-through device, and the vbar in the Qemu includes a region to which a device specific region allocated by a VFIO 2 module in the kernel space 612 to each pass-through device is mapped, and is used by the user to send a migration instruction and an information query to the pass-through device.

The kernel space 612 may include a VFIO 2 module and a physical functions (physical functions, PF) driver. The VFIO 2 may be configured to provide an interface for accessing a hardware device for the user space. For example, the VFIO 2 is configured to provide a unified abstract interface for direct live migration for the user space 611, to shield an underlying-layer hardware difference. In addition, the VFIO 2 may further provide a registration mechanism of a hardware physical PF driver for the pass-through device, to implement modular decoupling and achieve strong scalability. In an SR-IOV mode, the PF driver in the system architecture 600 can transfer a live migration instruction to the endpoint device, thereby implementing live migration of a pass-through device with a virtual function.

As shown in FIG. 6, the host 610 and the EP may be connected by using a PCIe bus. For example, the EP may be connected to the PCIe bus by using a switch (switch), and the switch may be configured to extend a link to provide more ports to connect the EP.

For example, the pass-through device may be a virtual device (supporting a Linux endpoint framework) based on an application-specific integrated circuit (application specific integrated circuit, ASIC) or a field-programmable logic gate array (field programmable gate array, FPGA), or another device having a computing resource and a storage resource. A manner fusing software programming and hardware assistance may be used to receive and process a live migration instruction from the PF driver, to complete a live migration procedure.

It should be noted that the method provided in this embodiment of this application may be performed by a physical host, and may be specifically implemented by executing a corresponding instruction by software deployed on the physical host. The software may be, for example, software deployed on a virtual machine created on the physical host.

The method for migrating a virtual machine in the embodiments of this application is described below in detail with reference to FIG. 7. The method shown in FIG. 7 may be performed by a source-end virtual machine running on a source-end physical host. For example, the source-end physical host may include a host machine operating system and the source-end virtual machine running in the host machine operating system. The host machine operating system may include a physical function PF driver, and data processed by the source-end virtual machine is transmitted by using a source-end pass-through device. A method 700 shown in FIG. 7 includes steps 710 to 730. These steps are separately described in detail below.

Step 710: The source-end virtual machine sends a first instruction to the source-end pass-through device by using the PF driver, where the first instruction is used to instruct the source-end pass-through device to record a storage address of dirty page data, and the dirty page data is data written by the source-end pass-through device to the source-end virtual machine in a direct memory access DMA manner.

The source-end pass-through device may be any one of at least one pass-through device configured on the source-end virtual machine.

For example, the source-end pass-through device may be a hardware device that is straight through to the source-end virtual machine. For example, the source-end pass-through device may be a PF device.

For example, the source-end pass-through device may be a virtual pass-through device. For example, a plurality of virtual pass-through devices may run on the source-end pass-through device. The virtual pass-through device is a virtual device running on the source-end pass-through device. The source-end pass-through device may be any one of the plurality of virtual pass-through devices, in other words, the source-end pass-through device may be a VF device.

The foregoing DMA access manner is a high-speed data transmission operation, and allows data to be directly read and written between an external device and a memory. The entire data transmission operation is performed under the control of a DMA controller. DMA control logic may include both a CPU and a DMA control interface logical chip. A DMA controller of an embedded system is built in a processor chip. During DMA transmission, the DMA controller directly controls a bus, and the CPU hands over a bus control right to the DMA controller. After DMA transmission ends, the DMA controller immediately hands over the bus control right to the CPU. One complete DMA data transmission process may include four steps: a DMA request, a DMA response, DMA transmission, and a DMA end. DMA transmission means that after the DMA controller obtains the bus control right, the CPU is immediately suspended or performs only an internal operation, and the DMA controller outputs a read/write command to directly control a RAM to perform DMA transmission with an I/O interface. Under the control of the DMA controller, data is directly transferred between the memory and the external device, and the CPU does not need to participate in a transferring process.

For example, that the source-end pass-through device accesses a memory of the source-end virtual machine in the DMA manner may mean that the source-end pass-through device is connected to an RC in a source-end physical host by using a PCIe bus to implement DMA access to a source-end virtual machine running on the source-end physical host. The RC is used to connect a processor and a memory subsystem to a PCI express switching structure including one or more switching devices.

Optionally, that the source-end virtual machine sends a first instruction to the source-end pass-through device by using the PF driver includes: The source-end virtual machine may send the first instruction to the PF driver, and the PF driver sends the first instruction to the source-end pass-through device.

In other words, the source-end virtual machine may send a migration instruction to the PF driver, and the PF driver transparently transmits the obtained migration instruction to the source-end pass-through device. The migration instruction may include the first instruction, a save instruction, a dirty page synchronization instruction, a suspend instruction, a start instruction, and a dirty page marking disabling instruction.

Step 720: The source-end virtual machine obtains a storage address that is of the dirty page data and that is recorded by the source-end pass-through device.

The dirty page data may be data written by the source-end pass-through device to the memory of the source-end virtual machine in the DMA manner. The storage address of the dirty page data may be a memory address of the data, and may also be referred to as dirty page information.

Optionally, the source-end virtual machine may send a dirty page synchronization instruction to the source-end pass-through device by using the PF driver, where the dirty page synchronization instruction includes a first address in first storage space, and the dirty page synchronization instruction is used to instruct the source-end pass-through device to synchronize the storage address of the dirty page data to a storage location that is in the first storage space and that is indicated by the first address. The source-end virtual machine reads the storage address of the dirty page data from the first storage space based on the first address.

The first storage space may be storage space allocated by the source-end physical host to the PF driver, and the first storage space is used to store a storage address that is of dirty page data and that is recorded by each of a plurality of virtual pass-through devices.

For example, the first storage space may be a memory that supports access in the DMA manner.

Optionally, the source-end virtual machine may periodically send the dirty page synchronization instruction to the source-end pass-through device by using the PF driver.

For example, the source-end virtual machine periodically sends the dirty page synchronization instruction to the PF driver, and the PF driver sends the dirty page synchronization instruction to the source-end pass-through device.

It should be understood that the source-end pass-through device may continuously write data to the memory of the source-end virtual machine in the DMA manner. Before the source-end pass-through device stops running, dirty page information is information that is continuously updated. Therefore, the source-end virtual machine may periodically send the dirty page synchronization instruction to the source-end pass-through device to obtain dirty page information that is continuously updated.

For example, at a first moment, the source-end pass-through device writes data to a memory address A of the source-end virtual machine in the DMA manner. When the source-end virtual machine obtains the memory address A, the source-end pass-through device may also write data to a memory address B of the source-end virtual machine in the DMA manner. Therefore, the source-end virtual machine may periodically send the dirty page synchronization instruction to the source-end pass-through device to obtain an updated storage address that is of the dirty page data and that is in the source-end pass-through device.

Step 730: The source-end virtual machine sends to-be-migrated data of the source-end virtual machine to a destination-end virtual machine, where the to-be-migrated data includes the dirty page data.

Optionally, the source-end virtual machine may send the dirty page data to a destination end in an iterative memory copy manner.

For example, after a virtual machine migration procedure is established, the source-end virtual machine may first copy all memory data to the destination-end virtual machine. The source-end virtual machine continuously obtains the storage address that is of the dirty page data and that is recorded in the source-end pass-through device. The source-end virtual machine obtains the dirty page data from the memory based on the storage address of the dirty page data, and copies dirty page data newly written to the memory to the destination-end virtual machine in each round of iterative copy, and exits iteration until a specific condition is reached, and performs final suspension copying. For example, when a generation rate of remaining dirty page data that needs to be copied is less than bandwidth of a live migration network, the source-end virtual machine may stop VCPU running and send remaining dirty page data to the destination-end virtual machine at one time, to keep memory consistency between the source-end virtual machine and the destination-end virtual machine.

Further, the source-end physical host may allocate second storage space to the PF driver, where the second storage space is used to store status information of each of the plurality of virtual pass-through devices, the status information is status information of each virtual pass-through device at a moment at which running stops, and the status information includes information about a register of each virtual pass-through device and information about a memory descriptor.

It should be noted herein that the information about the register may be status information of the register when the source-end pass-through device stops running, for example, may be information such as indexes of a receiving queue, a sending queue, and a control queue of a register in the source-end pass-through device. The information about the memory descriptor may be status information of receiving or sending data on a data plane at a moment at which the source-end pass-through device stops running. The source-end virtual machine obtains status information of the source-end pass-through device, and sends the status information to the destination-end virtual machine, so that status (for example, a register status and an interrupt status) consistency between the source-end pass-through device and a destination-end pass-through device before and after a process of migrating a virtual machine configured with a pass-through device can be ensured, thereby improving performance of virtual machine migration.

Optionally, the source-end virtual machine may send a save instruction to the source-end pass-through device by using the PF driver, where the save instruction includes a second address in second storage space, and the save instruction is used to instruct the source-end pass-through device to save the status information to a storage location that is in the second storage space and that is indicated by the second address. The source-end virtual machine may obtain the status information of the source-end pass-through device at the storage location that is in the second storage space and that corresponds to the second address.

For example, when the source-end virtual machine sends the save instruction to the source-end pass-through device, a memory address A of the source-end virtual machine is carried. The source-end virtual machine sends the save instruction to the PF driver. The PF driver may send the save instruction and a memory address B to the source-end pass-through device through a PF channel, and the memory address B is used to store the status information. The source-end pass-through device feeds back the status information to the PF driver, and the source-end pass-through device saves status information to the memory address B. After obtaining the status information, the PF synchronizes the status information to the memory address A of the source-end virtual machine, so that the source-end virtual machine obtains the status information of the source-end pass-through device.

It should be noted herein that, that the source-end virtual machine sends the migration instruction to the source-end pass-through device through the PF channel may be that the PF driver sends the migration instruction to the source-end pass-through device through the PF channel, and the PF channel may be a logical concept.

For example, the PF driver may include the PF channel. The PF channel is used by the PF driver to send, to the source-end pass-through device, the received migration instruction sent by the source-end virtual machine. An implementation form of the PF driver may include but is not limited to the following several manners.

Manner 1: The PF driver may use reserved storage space to enable the source-end virtual machine to send the migration instruction to the source-end pass-through device.

For example, the PF driver may send an address of the reserved storage space by using a first register of the source-end pass-through device. After receiving the address of the reserved storage space, a first source-end virtual machine continuously detects the storage space corresponding to the address. The PF driver writes the migration instruction to the reserved storage space, and the source-end pass-through device obtains the corresponding migration instruction when continuously detecting the reserved storage space.

It should be understood that the first register may be a transceiver register of the source-end pass-through device, and the first register supports only sending of information that includes a first address of the storage space and a size of the storage space.

The reserved storage space may be a memory that is allocated to the PF driver and accessed in the DMA manner.

Manner 2: The PF driver may use PCIe configuration space of the source-end pass-through device to enable the source-end virtual machine to send the migration instruction to the source-end pass-through device.

For example, the PF driver may write the migration instruction to a reserved bit of the PCIe configuration space of the source-end pass-through device, and the PCIe configuration space is used by the source-end pass-through device to obtain the migration instruction.

The reserved bit of the PCIe configuration space may be a reserved bit of existing PCIe configuration space of the source-end pass-through device.

For example, the PF driver may write the migration instruction to preconfigured PCIe configuration space of the source-end pass-through device, and the preconfigured PCIe configuration space is used by the source-end pass-through device to obtain the migration instruction.

The preconfigured PCIe configuration space may be PCIe configuration space that is configured for the source-end pass-through device to transmit the migration instruction.

It should be noted herein that, for each PCIe device, there is a segment of space, and host software may obtain information about the PCIe device by reading the segment of space, or may configure the PCIe device by using the segment of space. The segment of space is referred to as PCIe configuration space, and the PCIe configuration space is a logical concept and may implement information in the PCIe configuration space by using an underlying-layer hardware register.

In this embodiment of this application, after a virtual machine migration procedure is started, the source-end virtual machine may send the first instruction for indicating the source-end pass-through device to record the storage address of the dirty page data, where the dirty page data is the data written by the source-end pass-through device to the source-end virtual machine in the DMA manner; after receiving the first instruction, when writing the data to the source-end virtual machine in the DMA manner, the source-end pass-through device marks the storage address of the data; and the source-end pass-through device may obtain the storage address that is of the dirty page data and that is in the source-end pass-through device, and send the dirty page data to the destination-end virtual machine, to ensure memory consistency, before and after a migration process (the source-end virtual machine and the destination-end virtual machine), of the virtual machine configured with the pass-through device, and to ensure status consistency, before and after the migration process (the source-end pass-through device and a destination-end pass-through device), of the virtual machine configured with the pass-through device, thereby improving performance of virtual machine migration.

The foregoing method for migrating a virtual machine is briefly described below with reference to a system architectural diagram shown in FIG. 5.

As shown in FIG. 5, for example, the source-end virtual machine may be a Qemu, the source-end pass-through device may be an endpoint device, and a procedure in which the Qemu performs live migration may include the following steps.

(1) VFIO 2 in kernel space may provide an abstract interface for pass-through live migration for user space. The abstract interface for pass-through live migration may include a start instruction interface, a stop instruction interface, a pre-start instruction interface, a pre-stop instruction interface, a save instruction interface, a restore interface, a dirty page tracking enabling interface, a PF driver interface, and the like. The PF driver may perform registration in a memory of the VFIO 2, namely, a specific device region (device specific region). The device specific region may be used by a user to send a migration instruction and an information query to a pass-through device by using the Qemu.

For example, the PF driver may register an address of a callback function corresponding to the live migration instruction in the device specific region of the VFIO 2, and the device specific region is a memory in the VFIO 2.

The callback function is a function called by a function pointer (address). The PF driver may register the address of the callback function with a VFIO module in the kernel space. When the VFIO in the kernel space receives a migration instruction sent from the user space, the VFIO module determines the address of the callback function in the PF driver and instructs the PF driver to execute the function.

It should be noted herein that there is mapping between vbar in VFIO 1 and the device specific region, in other words, the user writes a live migration instruction to the vbar in the VFIO 1, and the device specific region in the corresponding VFIO 2 in the kernel space obtains the live migration instruction, where Vbar is a memory in the VFIO 1, and is used by the Qemu to send the live migration instruction to the pass-through device.

(2) An administrator (for example, the user) may configure a pass-through device for a virtual machine, where VFIO 1 in user space Qemu includes Vbar, and the Vbar is used for information transfer between the pass-through device and the Qemu.

When sending the migration instruction to different pass-through devices, the Qemu may send the migration instruction to the pass-through devices by using different memory resources in the vbar.

(3) The administrator sends the migration instruction, and the Qemu may transfer the live migration instruction to the device specific region in the kernel space VFIO 2 by using the vbar in the VFIO 1.

(4) After obtaining the live migration instruction, the VFIO 2 instructs, by using the address that is of the callback function and that is registered by the PF driver with the VFIO2 module, the PF driver to execute the callback function corresponding to the address of the callback function.

It should be understood that, that the Qemu delivers the live migration instruction may be considered as that the Qemu calls a callback function corresponding to the live migration instruction in the PF driver.

For example, the Qemu sends the first instruction, and the first instruction instructs the source-end pass-through device to enable a dirty page marking mode, in other words, the Qemu maps the first instruction to the device specific region by using a memory corresponding to the vbar in the VFIO 1, so that the VFIO 2 finds, in the device specific region, an address of a callback function corresponding to the dirty page marking mode. The VFIO2 instructs, by using the address of the callback function, the PF driver to execute the callback function, and the PF driver executes the callback function corresponding to the dirty page marking mode to instruct the source-end pass-through device to mark a storage address of data when writing the data to a memory of the source-end virtual machine in a DMA manner.

(5) The PF driver executes the corresponding callback function for enabling the dirty page marking mode. Specifically, the PF driver may send the first instruction to the source-end pass-through device through a PF channel, in other words, the PF driver sends the first instruction to an EP.

(6) After receiving the live migration instruction, the EP performs an operation corresponding to the live migration instruction.

For example, if the EP receives the first instruction, the EP enables the dirty page marking mode.

During enabling of the dirty page marking mode, the EP may mark a memory page corresponding to the data written to the memory of the virtual machine in the DMA manner.

(7) The EP records the memory address in a dirty page bitmap interval, and the dirty page bitmap interval may be storage space in the EP.

Optionally, the storage space may be a memory that is accessed in the DMA manner.

(8) The Qemu sends a dirty page synchronization instruction to the pass-through device, where the dirty page synchronization instruction includes a first address in first storage space, and the dirty page synchronization instruction is used to instruct the EP to synchronize the marked memory address to a storage location that is in the first storage space and that is indicated by the first address.

For example, the first storage space may be a DMA memory in the PF driver.

It should be understood that a specific procedure in which the Qemu sends the dirty page synchronization instruction to the pass-through device is similar to the foregoing procedure of sending the first instruction, and details are not described herein again.

(9) After receiving the dirty page synchronization instruction, the EP synchronizes the marked memory address to a storage location that is of the PF driver and that is indicated by the first address.

It should be noted herein that, because the EP may continuously write data to the memory of the virtual machine in the DMA manner, the dirty page synchronization instruction may be an instruction that is periodically sent, in other words, a memory address stored at the storage location of the PF driver may be a memory address that is continuously updated.

(10) The PF driver sends the obtained memory address marked by the EP to the device specific region in the VFIO 2, and maps the obtained memory address to the vbar in the user space VFIO 1 module by using the device specific region, so that the Qemu obtains the marked memory address from the VFIO 1.

Optionally, the PF driver may directly copy the obtained memory address marked by the EP to storage space applied for by the VFIO 1 in the Qemu, so that the Qemu obtains the marked memory address from the VFIO 1.

(11) By using the foregoing steps (1) to (10), the Qemu may send the live migration instruction to the EP, and the Qemu may obtain a corresponding operation result obtained after the EP performs live migration. After live migration succeeds or fails, the Qemu may send a dirty page marking disabling instruction to the EP by using the foregoing procedure, to instruct the EP to disable a dirty page marking mode.

Figures 8, 9:
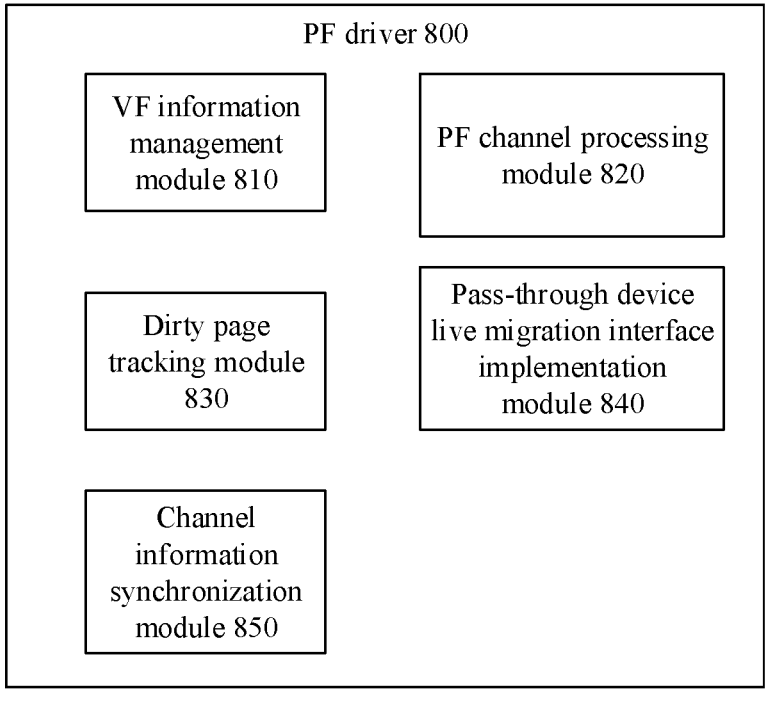
FIG. 8 is a diagram of a logical architecture of a PF driver according to an embodiment of this application.
FIG. 9 is a schematic diagram in which a virtual machine sends a migration instruction to a virtual pass-through device according to an embodiment of this application.

FIG. 8 is a diagram of a logical architecture of a PF driver according to an embodiment of this application. As shown in FIG. 8, a PF driver 800 may include a VF information management module 810, a PF channel processing module 820, a dirty page tracking module 830, a pass-through device live migration interface implementation module 840, and a channel information synchronization module 850. The modules in the PF driver 800 may be implemented by executing corresponding instructions by using software. The modules in the PF driver 800 are described in detail below.

The VF information management module 810 may be configured to: manage one or more source-end pass-through devices corresponding to a source-end virtual machine, and establish a correspondence between a PF driver and a pass-through device, including resource application, establishment, and the like of various PF channels.

In this embodiment of this application, a migration instruction and dirty page information may be transmitted by using the PF driver. A pass-through device configured for a virtual machine may be a plurality of virtual pass-through devices running on one EP, in other words, may be different virtual VF devices in the EP, and the VF information management module 810 may be configured to manage different VF devices. For example, one VF may be used to determine a PF device corresponding to the VF, and may determine various associated information, such as of number.

The PF channel processing module 820 may be used for information transmission with the pass-through device. A premise for establishing the channel is that the EP can support concurrent operations, and concurrent transmission of a live migration instruction may be implemented by using the PF channel processing module 820, to implement efficient pass-through live migration performance.

It should be noted that, in this embodiment of this application, a migration instruction can be concurrently transmitted between different VF devices corresponding to a same type of PF device, and the source-end pass-through device may be different VF devices in the PF device.

The PF channel processing module 820 may include the following several possible implementations.

Implementation 1: PCIe configuration space is used.

In a possible implementation, the PF driver may send the migration instruction to the source-end pass-through device by using a reserved bit of existing PCIe configuration space. For example, the PF driver may write the migration instruction to the reserved bit of the PCIe configuration space of the source-end pass-through device, so that the source-end pass-through device obtains the corresponding migration instruction by using the PCIe configuration space.

In another possible implementation, PCIe configuration space that supports live migration may be extended, including: recording an instruction that needs to be used for live migration. In addition, the PCIe configuration space may be used to record table information used by the VF to perform a migration operation. This table is stored in a memory that is on an EP side and to which a BAR points. Different entries in the table record migration-related information of different VFs, and a PF channel transmits a live migration instruction by using the entry. After completing a live migration instruction action transmitted in a VF entry, the EP also records completion status return in a status bit of the VF entry.

It should be understood that a capability (Capability) means that PCI-X and PCIe bus specifications require that a device needs to support a capabilities structure. Basic configuration space of a PCI bus includes a capabilities pointer register, and the register stores a head pointer of a capabilities structure linked list. One PCIe device may include a plurality of capability structures, and these registers form a linked list. Each capability has a unique ID number, indicating a capability of the PCIe device.

Implementation 2: A DMA solution is used.

For example, a segment of DMA memory may be applied in advance for the PF driver by using a physical host, and an address of the segment of DMA memory is sent to a hardware EP device by using a hardware register before a migration procedure is performed. Then, the PF driver may write a live migration-related instruction to the segment of DMA memory, and the EP reads information in the segment of DMA memory to obtain a specific live migration instruction, and writes a completion status corresponding to the live migration instruction to the PF driver.

It should be understood that the hardware register may be a transceiver register of the source-end pass-through device, and the register supports only a function of sending information that includes a first address of storage space and a size of the storage space.

It should be noted that, in this embodiment of this application, concurrent execution of different VFs is supported by using an efficient PF channel designing method, to improve live migration performance. This module has the following features: A software stack may be iteratively multiplexed between different hardware; different VFs and different VMs are supported to concurrently perform live migration; and status bit return is supported, such as "succeed", "fail", "operation not allowed", and "timeout".

Optionally, a plurality of virtual pass-through devices may run on the source-end pass-through device, the plurality of virtual pass-through devices may include a first virtual pass-through device and a virtual pass-through device, and that the source-end virtual machine sends an instruction to the source-end pass-through device by using the PF driver includes:

after a feedback instruction that is of a second instruction and that is sent by the PF driver is received, the source-end virtual machine sends a third instruction to the second virtual pass-through device by using the PF driver, where the feedback instruction indicates that the PF driver has sent the second instruction to the first virtual pass-through device.

It should be understood that the second instruction and the third instruction may be any migration instruction. For example, the second instruction and the third instruction may be any one of the first instruction, the dirty page synchronization instruction, or the save instruction.

For example, as shown in FIG. 9, FIG. 9(a) is a schematic diagram in which a Qemu sends a live migration instruction in a serial manner, and FIG. 9(b) is a schematic diagram in which an optimized Qemu supports concurrent sending of a live migration instruction.

As shown in FIG. 9(a), the Qemu sends the live migration instruction in the serial manner, in other words, after Qemu sends a first live migration instruction to a VF device on an EP, 1 to 8 need to be performed, in other words, the Qemu can send a second live migration instruction to different VF devices only after the VF device completes execution of the first live migration instruction. In a procedure of sending the live migration instruction in the serial manner, relatively long waiting time is required, in other words, in a procedure in which the Qemu processes live migration, efficiency is relatively low, performance is relatively poor, and duration of waiting for live migration is excessively long.

As shown in FIG. 9(b), the optimized Qemu supports concurrent sending of the live migration instruction. As shown in FIG. 9(b), the Qemu sends a first live migration instruction to a VF device on an EP. After the PF driver sends the first live migration instruction to the EP, the PF driver may directly perform feedback for the first live migration instruction, and can perform feedback to the Qemu without a need to wait for the VF device to complete an operation corresponding to the first live migration instruction. Based on the schematic diagram shown in FIG. 9(b), after delivering the first live migration instruction, the Qemu receives response information of the first live migration instruction in a very short time, and may further send a second live migration instruction, in other words, in the schematic diagram shown in FIG. 9(b), the Qemu can support concurrent sending of a plurality of migration instructions. In this embodiment of this application, a VFIO interface may be newly added to obtain, after the Qemu delivers live migration instructions to all VF devices, an execution result of each VF device by using the PF driver. The PF driver in this embodiment of this application can support the Qemu in concurrently sending the live migration instruction.

The dirty page tracking module 830 is configured to obtain dirty page information of the source-end pass-through device. For example, the dirty page tracking module 830 may send an address in first storage space in the PF driver to the source-end pass-through device, where the first storage space may support a memory accessed in a DMA manner, and the first storage space may be used to store a storage address that is of dirty page data and that is recorded by each of the plurality of virtual pass-through devices.

The pass-through live migration interface implementation module 840 is used for an implementation part and a registration part of a live migration function interface related to a device in VFIO.

The channel information synchronization module 850 is configured to implement synchronization of a live migration-related instruction. For example, at a live migration suspending phase, device information of an endpoint device needs to be stored, and a save instruction may be delivered to the endpoint device by using the PF driver, and then the endpoint device is waited for completion of saving of the device information, and a mechanism of waiting for completion may be completed by using the channel information synchronization module 850.

Figure 10:
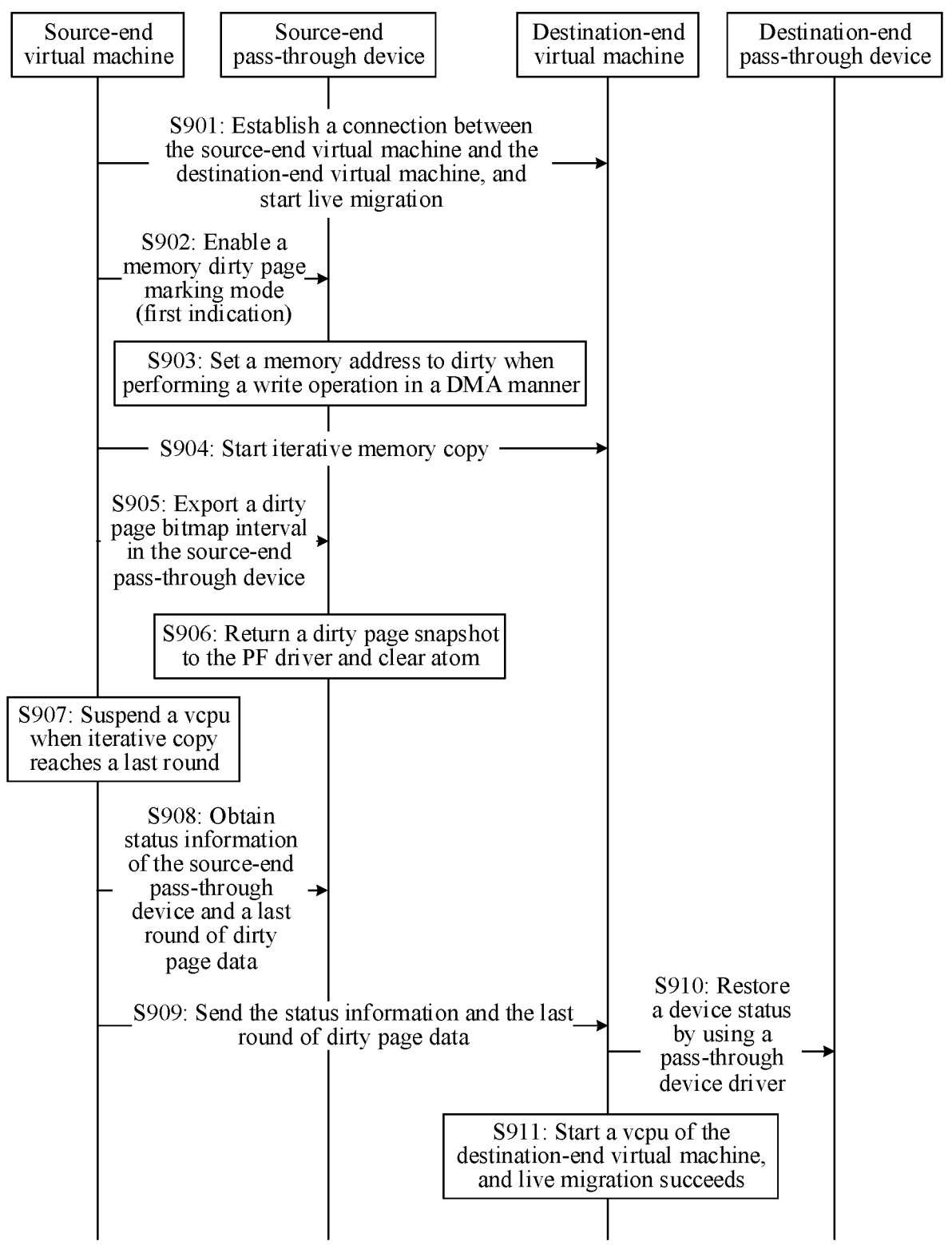
FIG. 10 is a schematic diagram of a method for migrating a virtual machine according to another embodiment of this application.

FIG. 10 is a schematic flowchart of a live migration method for a virtual machine configured with a pass-through device according to an embodiment of this application. A source-end virtual machine and a destination-end virtual machine may be located on different servers. A method 900 shown in FIG. 10 includes steps 901 to 911. Steps 901 to 911 are separately described in detail below.

Step 901: Establish a connection between the source-end virtual machine and the destination-end virtual machine, and start live migration.

The connection may be established between the source-end virtual machine and the destination-end virtual machine by using a transmission control protocol (transmission control protocol, TCP).

Step 902: The source-end virtual machine notifies all corresponding source-end pass-through devices to enable a memory dirty page marking mode.

For example, the source-end virtual machine may send a first instruction by using a PF driver to instruct the source-end pass-through device to start the memory dirty page marking mode, and the PF driver notifies all the source-end pass-through devices of the first instruction by using a source-end pass-through device driver. The memory dirty page marking mode (also referred to as a dirty page marking mode) means that the source-end pass-through device marks a memory address of data when the source-end pass-through device writes the data to a memory of the source-end virtual machine in a DMA manner.

Step 903: When performing a write operation on the memory of the virtual machine in the DMA manner, the source-end pass-through device sets a memory address corresponding to the write operation to dirty.

To set the memory address to dirty is to mark a memory address corresponding to the write operation.

For example, a dirty page bitmap interval in the source-end pass-through device may be a memory that is in the source-end pass-through device and that is used to record dirty page information.

In a possible implementation, the source-end pass-through device may store the dirty page information in the dirty page bitmap interval in a form of a bitmap.

In a possible implementation, the source-end pass-through device may store the dirty page information in the dirty page bitmap interval in a form of a linked list.

Step 904: The source-end virtual machine starts iterative memory copy.

When a live migration procedure starts, all memory data in the source-end virtual machine is copied to a memory of the destination-end virtual machine.

Step 905: The source-end virtual machine obtains the dirty page bitmap interval in the source-end pass-through device.

The dirty page bitmap interval is a memory that is used by the source-end pass-through device to record the dirty page information.

Step 906: The source-end pass-through device returns a dirty page snapshot to the PF driver and clears atoms.

For example, the source-end pass-through device receives a dirty page synchronization instruction sent by the source-end virtual machine, and saves the dirty page information in the dirty page bitmap interval in the source-end pass-through device to first storage space in the PF driver.

It should be noted herein that an atomic operation can ensure that no concurrent operation occurs in a process of re-writing dirty page information to the dirty page bitmap interval and clearing the dirty page bitmap interval. When the source-end virtual machine obtains the dirty page information of the dirty page bitmap interval in the source-end pass-through device, a memory address of the source-end virtual machine may also be currently being marked by the source-end pass-through device in this case. A memory address newly written to the dirty page bitmap interval may participate in current export, in other words, is not written to the dirty page bitmap interval any longer. Alternatively, a memory address newly written to the dirty page bitmap interval may not participate in current export, and is written to the dirty page bitmap range first and then exported after the dirty page synchronization instruction of the source-end virtual machine is received next time. Clearing means to clear data in the dirty page bitmap interval, in other words, to clear the memory address recorded in the dirty page bitmap interval.

Figure 7:
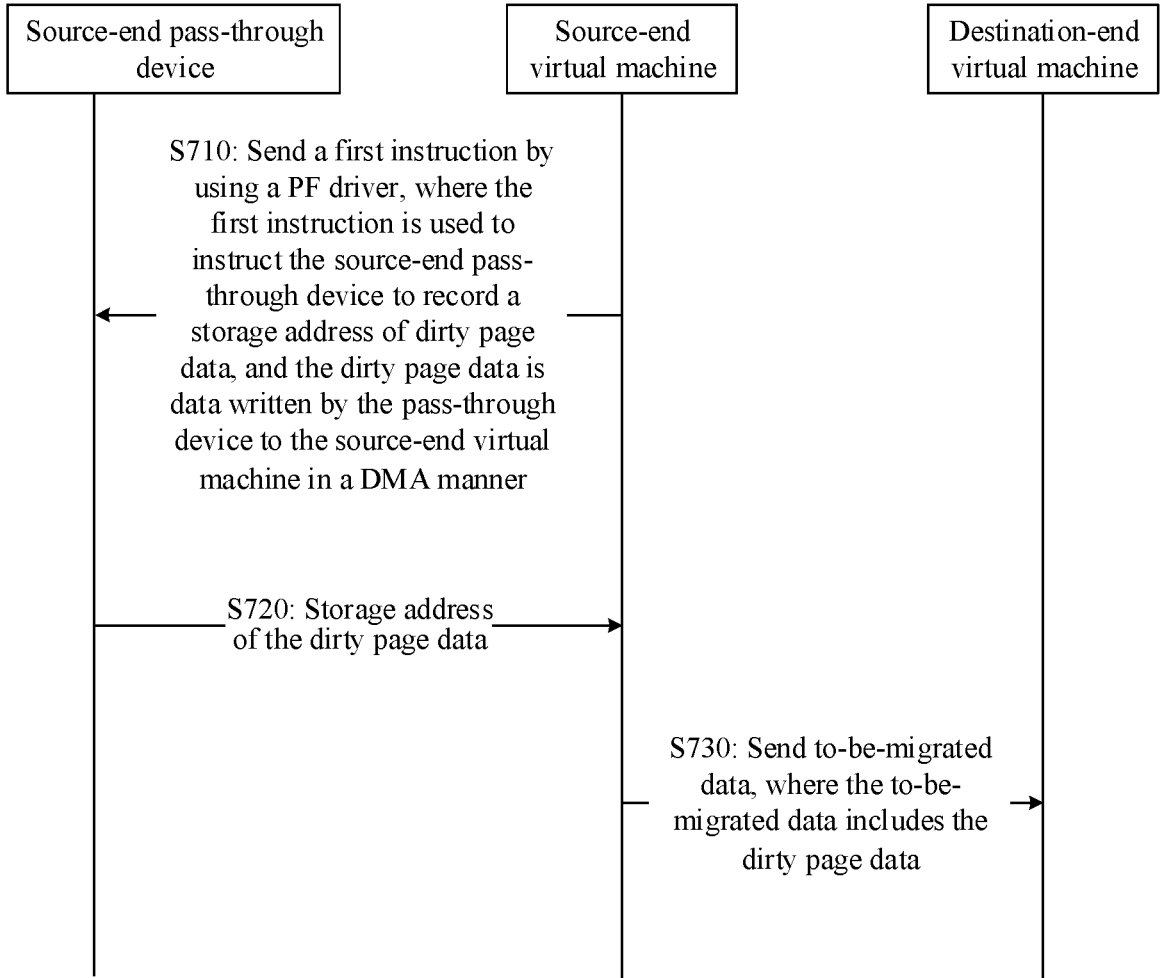
FIG. 7 is a schematic diagram of a method for migrating a virtual machine according to an embodiment of this application.

A specific implementation process of the steps shown in FIG. 9 is similar to a specific process of obtaining the dirty page information in step 720 shown in FIG. 7. For brevity, details are not described herein again.

It should be noted herein that the source-end pass-through device may continuously write data to the memory of the source-end virtual machine in the DMA manner. Therefore, before the source-end pass-through device stops running, dirty page information is information that is continuously updated.

In other words, the source-end virtual machine needs to complete a plurality of times of memory copy, and continuously send latest obtained dirty page data to the destination-end virtual machine.

Optionally, after step 906, the source-end virtual machine may send a pre-suspend instruction to the source-end pass-through device by using the PF driver, and the pre-suspend instruction is used to instruct the source-end pass-through device to prepare for migration.

Specifically, the source-end virtual machine may send the pre-suspend instruction to the PF driver, and the PF driver may send the pre-suspend instruction to the source-end pass-through device through the foregoing PF channel.

Step 907: When iterative copy is sufficiently converged, suspend a vcpu of the source-end virtual machine and obtain a last round of dirty page.

Being sufficiently converged may mean that when a very small amount of dirty page data needs to be copied, the source-end virtual machine may stop running and copy a remaining small part of dirty page data to the destination-end virtual machine at one time, and the remaining small part of dirty page data may be the foregoing last round of dirty page.

It should be understood that the source-end pass-through device may continuously write data to the memory of the source-end virtual machine in the DMA manner. Therefore, before the source-end pass-through device stops running, dirty page information is information that is continuously updated. In other words, the dirty page information may include dirty page information continuously updated in an intermediate access process of the source-end pass-through device and dirty page information obtained when the source-end pass-through device stops running.

It should be understood that the virtual machine may obtain the dirty page information from the first storage space of the PF driver through iterative copy. For a specific procedure of iterative copy, refer to the current technology. For brevity, detailed descriptions of a specific method are omitted in this application.

Optionally, after step 907, the source-end virtual machine may send a suspend instruction to the source-end pass-through device by using the PF driver, and the suspend instruction is used to instruct the source-end pass-through device to stop running.

For example, the suspend instruction may be used to instruct the source-end pass-through device to stop receiving or sending data on a data plane.

Specifically, the source-end virtual machine may send the pre-suspend instruction to the PF driver, and the PF driver may send the pre-suspend instruction to the source-end pass-through device through the foregoing PF channel.

Step 908: The source-end virtual machine obtains the last round of dirty page of the source-end pass-through device.

It should be noted herein that the last round of dirty page is a dirty page after the vcpu of the source-end virtual machine is suspended.

Step 909: The source-end virtual machine sends the last round of dirty page to the destination-end virtual machine.

Optionally, after step 909, the source-end virtual machine may send a save instruction to the source-end pass-through device by using the PF driver, and the save instruction is used to instruct the source-end pass-through device to store status information at a moment at which running stops.

For example, the source-end virtual machine sends the save instruction to a source-end pass-through device driver, where the save instruction carries a memory address A of the source-end virtual machine; the source-end virtual machine sends the save instruction to the PF driver, the PF driver may configure a DMA memory address B to store status information, the PF driver sends the save instruction to the source-end pass-through device driver, and the source-end pass-through device driver controls the source-end pass-through device to store the status information. When the source-end pass-through device driver feeds back the status information to the PF driver, the PF driver saves the status information to the DMA memory address B, and synchronizes the status information to the memory address A of the source-end virtual machine, so that the source-end virtual machine obtains the status information of the source-end pass-through device.

For example, the status information may include a status of a register and a status of a memory descriptor.

Optionally, the destination-end virtual machine may send a pre-start instruction to a destination-end pass-through device by using a PF driver running on a destination-end physical host, and the pre-start instruction is used to instruct the destination-end pass-through device to prepare for migration.

Step 910: The source-end virtual machine sends the status information of the source-end pass-through device to the destination-end virtual machine.

Optionally, the destination-end virtual machine may send a start instruction to the destination-end pass-through device by using the PF driver running on the destination-end physical host, and the start instruction is used to instruct the destination-end pass-through device to resume running.

Optionally, the destination-end virtual machine may send a restore instruction to the destination-end pass-through device by using the PF driver running on the destination-end physical host, and the restore instruction is used to instruct the destination-end pass-through device to restore a status of the source-end pass-through device. It should be understood that, the destination-end pass-through device restores the status information of the source-end pass-through device, so that status consistency between the source-end pass-through device and the destination-end pass-through device can be ensured. For example, register status consistency and interrupt status consistency between pass-through devices (the source-end pass-through device and the destination-end pass-through device) before and after migration can be ensured.

Step 911: Start a CPU of the destination-end virtual machine, and live migration succeeds.

It should be understood that in the method for migrating a virtual machine shown in FIG. 10, the source-end virtual machine may send a migration instruction to the source-end pass-through device by using the PF driver shown in FIG. 8.

In this embodiment of this application, when live migration needs to be performed for the source-end virtual machine, the source-end virtual machine may send the first instruction to any source-end pass-through device that is straight through to the source-end virtual machine, to instruct the source-end pass-through device to mark a memory address of data when writing the data to the source-end virtual machine in the DMA manner. Further, the source-end virtual machine may obtain the marked memory address from the source-end pass-through device, obtain the dirty page data based on the marked memory address, and send the dirty page data to a destination end. In the foregoing technical solution, a problem that a CPU of a physical host cannot obtain a storage address of the dirty page data in a scenario in which the source-end pass-through device directly modifies a memory of a virtual machine in the DMA manner without using the CPU can be resolved. Based on the foregoing technical solution, memory consistency, before and after a migration process, of a virtual machine configured with a pass-through device can be ensured. In addition, in this embodiment of this application, the status information of the source-end pass-through device is obtained, so that status consistency between the source-end pass-through device and the destination-end pass-through device can be ensured, thereby improving performance of virtual machine migration.

The method for migrating a virtual machine provided in the embodiments of this application is described in detail above with reference to FIG. 1 to FIG. 10. A server and a pass-through device that are provided in the embodiments of this application are described in detail below with reference to FIG. 11 to FIG. 14. It should be understood that descriptions of the method embodiment correspond to descriptions of the apparatus embodiment. Therefore, for a part that is not described in detail, refer to the foregoing method embodiment.

Figure 11:
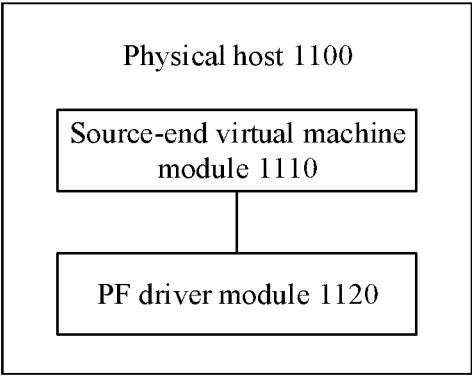
FIG. 11 is a schematic block diagram of a physical host according to an embodiment of this application.

FIG. 11 is a schematic block diagram of a physical host 1100 according to an embodiment of this application. It should be understood that the physical host 1100 can perform steps/functions in FIG. 7 to FIG. 10. To avoid repetition, details are not described herein again. The physical host 1100 may be a server, or the physical host 1100 may be a chip configured on the server. The physical host 1100 may include a source-end virtual machine module 1110 and a PF driver module 1120. The source-end virtual machine module 1110 is configured to send a first instruction to a source-end pass-through device by using the PF driver module, where the first instruction is used to instruct the source-end pass-through device to record a storage address of dirty page data, and the dirty page data is data written by the source-end pass-through device to the source-end virtual machine module in a direct memory access DMA manner.

The source-end virtual machine module 1110 is further configured to: obtain the storage address that is of the dirty page data and that is recorded by the source-end pass-through device, and send to-be-migrated data to a destination-end virtual machine, where the to-be-migrated data includes dirty page data of the source-end virtual machine module.

Optionally, in a possible implementation, the source-end virtual machine module 1110 is specifically configured to send the first instruction to the PF driver module.

The PF driver module 1120 is specifically configured to send the first instruction to the source-end pass-through device.

Optionally, in a possible implementation, the PF driver module 1120 is specifically configured to:

write the first instruction to reserved storage space, where the reserved storage space is used by the source-end pass-through device to obtain the first instruction.

Optionally, in a possible implementation, the PF driver module 1120 is further configured to:

send an address of the reserved storage space to the source-end pass-through device by using a register of the source-end pass-through device.

Optionally, in a possible implementation, the PF driver module 1120 is specifically configured to:

write the first instruction to a reserved bit of PCIe configuration space of the source-end pass-through device, where the PCIe configuration space is used by the source-end pass-through device to obtain the instruction.

Optionally, in a possible implementation, the PF driver module 1120 is specifically configured to write the first instruction to preconfigured PCIe configuration space of the source-end pass-through device, where the preconfigured PCIe configuration space is used by the source-end pass-through device to obtain the first instruction.

Optionally, in a possible implementation, the physical host 1100 further includes:

a control module, configured to allocate first storage space to the PF driver module, where the first storage space is used to store a storage address that is of the dirty page data and that is recorded by each of a plurality of virtual pass-through devices.

Optionally, in a possible implementation, the source-end virtual machine module 1110 is further configured to:

send a dirty page synchronization instruction to the source-end pass-through device by using the PF driver module, where the dirty page synchronization instruction includes a first address in the first storage space, and the dirty page synchronization instruction is used to instruct the source-end pass-through device to synchronize the storage address of the dirty page data to a storage location that is in the first storage space and that is indicated by the first address; and read the storage address of the dirty page data from the first storage space based on the first address.

Optionally, the dirty page synchronization instruction is an instruction that is periodically sent.

Optionally, in a possible implementation, the control module is further configured to:

allocate second storage space to the PF driver module, where the second storage space is used to store status information of each of the plurality of virtual pass-through devices, the status information is status information of each virtual pass-through device at a moment at which running stops, and the status information includes information about a register of each virtual pass-through device and information about a memory descriptor.

Optionally, in a possible implementation, the source-end virtual machine module 1110 is further configured to:

send a save instruction to the source-end pass-through device by using the PF driver module, where the save instruction includes a second address in the second storage space, and the save instruction is used to instruct the source-end pass-through device to save the status information to a storage location that is in the second storage space and that is indicated by the second address; and obtain the status information at the storage location that is in the second storage space and that corresponds to the second address.

Optionally, in a possible implementation, the plurality of virtual pass-through devices include a first virtual passthrough device and a second virtual pass-through device, and the source-end virtual machine module 1110 is further configured to:

after a feedback instruction that is of a second instruction and that is sent by the PF driver is received, send a third instruction to the second virtual pass-through device by using the PF driver module, where the feedback instruction indicates that the PF driver has sent the second instruction to the first virtual pass-through device.

Optionally, the second instruction and the third instruction may be any migration instruction, for example, may be any one of the first instruction, the dirty page synchronization instruction, and the save instruction.

Optionally, in a possible implementation, the source-end pass-through device is a virtual function VF device.

It should be understood that the physical host 1100 herein is embodied in a form of a functional unit. The term "module" herein may be implemented in a form of software and/or hardware, and this is not specifically limited. For example, the "unit" may be a software program, a hardware circuit, or a combination thereof that implements the foregoing functions. The hardware circuit may include an application-specific integrated circuit (application specific integrated circuit, ASIC), an electronic circuit, a memory and a processor (for example, a shared processor, a dedicated processor, or a group processor) that is configured to execute one or more software or firmware programs, a combined logic circuit, and/or another suitable component that supports the described functions.

Therefore, modules in the examples described in the embodiments of this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 12:
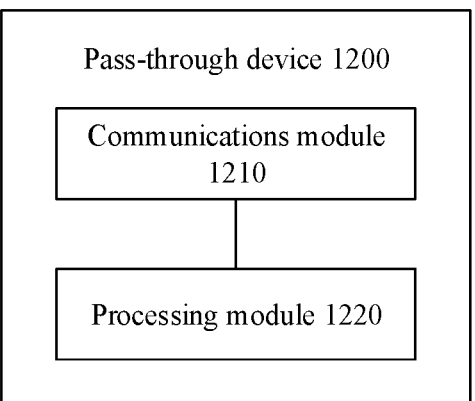
FIG. 12 is a schematic block diagram of a pass-through device according to an embodiment of this application.

FIG. 12 is a schematic block diagram of a pass-through device 1200 according to an embodiment of this application. It should be understood that the pass-through device 1200 can perform steps/functions in FIG. 7 to FIG. 10. To avoid repetition, details are not described herein again. The pass-through device 1200 includes a communications module 1210 and a processing module 1220. The communications module 1210 is configured to receive a first instruction sent by a source-end virtual machine by using a physical function PF driver, where the first instruction is used to instruct the pass-through device to record a storage address of dirty page data, the dirty page data is data written by the pass-through device to the source-end virtual machine in a direct memory access DMA manner, the PF driver runs in a host operating system of a source-end physical host, and the source-end physical host further includes the source-end virtual machine running in the host operating system.

The processing module 1220 is configured to record the storage address of the dirty page data according to the first instruction.

The communications module 1210 is further configured to send the storage address of the dirty page data to the source-end virtual machine.

Optionally, in a possible implementation, the communications module 1210 is specifically configured to:

receive the first instruction sent by the PF driver, where the first instruction is an instruction that is transparently transmitted by the source-end virtual machine to the pass-through device by using the PF driver.

Optionally, in a possible implementation, the communications module 1210 is further configured to:

obtain, by the pass-through device, an address of reserved storage space.

The processing module 1220 is further configured to obtain, based on the address of the reserved storage space, the first instruction carried in the reserved storage space, where the first instruction is an instruction written by the PF driver to the reserved storage space.

Optionally, in a possible implementation, the communications module 1210 is specifically configured to:

obtain the first instruction carried in a reserved bit of PCIe configuration space of the pass-through device, where the first instruction is an instruction written by the PF driver to the reserved bit.

Optionally, in a possible implementation, the communications module 1210 is specifically configured to:

obtain the first instruction carried in preconfigured PCIe configuration space of the pass-through device, where the first instruction is an instruction written by the PF driver to the preconfigured PCIe configuration space.

Optionally, in a possible implementation, the communications module 1210 is further configured to:

receive a dirty page synchronization instruction sent by the source-end virtual machine by using the PF driver, where the dirty page instruction includes a first address in first storage space, the first storage space represents storage space that is allocated to the PF driver and that is used to synchronize the storage address of the dirty page data, and the dirty page synchronization instruction is used to instruct the pass-through device to synchronize the storage address of the dirty page data to a storage location that is in the first storage space and that is indicated by the first address.

The processing module 1220 is further configured to synchronize, based on the dirty page synchronization instruction, the storage address of the dirty page data to the storage location that is in the first storage space and that is indicated by the first address.

Optionally, in a possible implementation, a plurality of virtual pass-through devices run on the pass-through device, and the first storage space is used to store a storage address that is of dirty page data and that is recorded by each of the plurality of virtual pass-through devices.

Optionally, in a possible implementation, the communications module 1210 is further configured to:

receive a save instruction sent by the source-end virtual machine by using the PF driver, where the save instruction includes a second address in second storage space, the second storage space represents storage space that is allocated to the PF driver and that is used to store status information of the pass-through device at a moment at which running stops, the save instruction is used to instruct the pass-through device to save the status information to a storage location that is in the second storage space and that is indicated by the second address, and the status information includes information about a register of the pass-through device and information about a memory descriptor.

The processing module 1220 is further configured to save, according to the save instruction, the status information to the storage location that is in the second storage space and that is indicated by the second address.

Optionally, in a possible implementation, a plurality of virtual pass-through devices run on the pass-through device, and the second storage space is used to store status information of each of the plurality of virtual pass-through devices.

Optionally, in a possible implementation, the pass-through device is a virtual function VF device.

It should be understood that the pass-through device 1200 herein is embodied in a form of a functional unit. The term "module" herein may be implemented in a form of software and/or hardware, and this is not specifically limited. For example, the "unit" may be a software program, a hardware circuit, or a combination thereof that implements the foregoing functions. The hardware circuit may include an application-specific integrated circuit (application specific integrated circuit, ASIC), an electronic circuit, a memory and a processor (for example, a shared processor, a dedicated processor, or a group processor) that is configured to execute one or more software or firmware programs, a combined logic circuit, and/or another suitable component that supports the described functions.

Therefore, modules in the examples described in the embodiments of this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Figure 13:
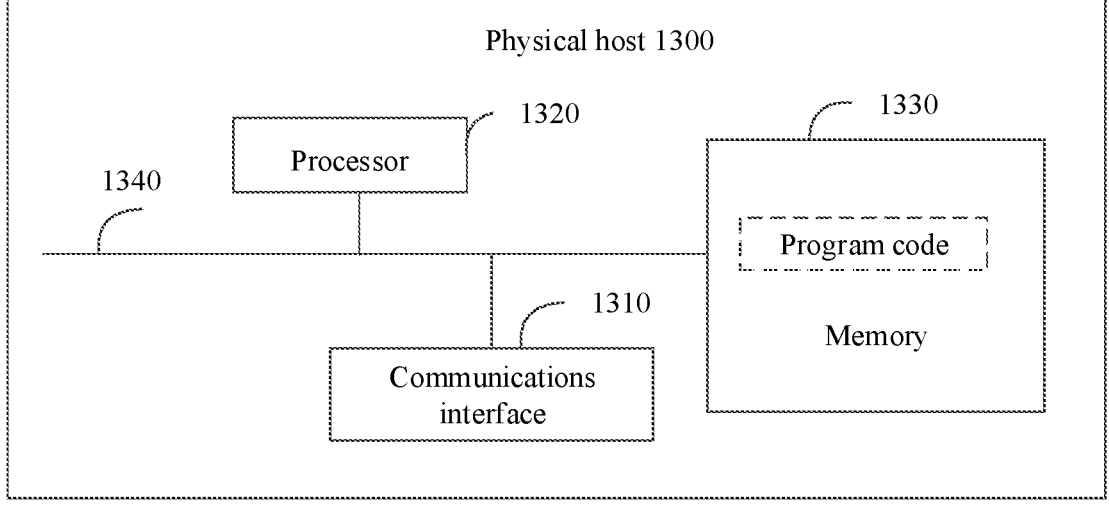
FIG. 13 is a schematic block diagram of a physical host according to another embodiment of this application.

FIG. 13 is a schematic block diagram of a physical host according to an embodiment of this application. The physical host 1300 may include a communications interface 1310, a processor 1320, and a memory 1330.

Optionally, the physical host 1300 may further include a bus 1340. The communications interface 1310, the processor 1320, and the memory 1330 may be connected to each other by using the bus 1340. The bus 1340 may be a peripheral component interconnect (peripheral component interconnect, PCI) bus, an extended industry standard architecture (extended industry standard architecture, EISA) bus, or the like. The bus 1340 may be classified into an address bus, a data bus, a control bus, and the like. For ease of representation, only one thick line is used to represent the bus in FIG. 13, but this does not mean that there is only one bus or only one type of bus.

The memory 1330 may be configured to store program code and data of a computer system. Therefore, the memory 1330 may be an internal storage unit of the processor 1320, may be an external storage unit independent of the processor 1320, or may be a part including an internal storage unit of the processor 1320 and an external storage unit independent of the processor 1320.

The processor 1320 may include one or more general-purpose processors, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor 1320 may implement or execute various example logical blocks, modules, and circuits described with reference to content disclosed in this application. The processor may be a combination for implementing a computing function, for example, a combination of a plurality of microprocessors, or a combination of the DSP and a microprocessor. The processor 1320 may be configured to run a program of a processing function in related program code. In other words, the processor 1320 may execute the program code to implement functions of a sending module and/or an obtaining module. For the functions of the sending module and the obtaining module, refer to related descriptions in the foregoing embodiments.

In a possible implementation, the processor 1320 is configured to run related program code, to implement a function of the source-end virtual machine in the foregoing method embodiments of this application, or implement the method in steps 710 to 730 shown in FIG. 7 of this application, or implement the method in steps 901 to 911 shown in FIG. 10 of this application, and/or implement other steps of the technology described in this application. Details are not described or limited herein in this application.

The communications interface 1310 may be a wired interface (for example, an Ethernet interface) or a wireless interface (for example, a cellular network interface or a wireless local area network interface), and is configured to communicate with another module/device.

The memory 1330 may include a volatile memory (volatile memory), such as a random access memory (random access memory, RAM); or the memory may include a non-volatile memory (non-volatile memory), such as a read-only memory (read-only memory, ROM), a flash memory (flash memory), a hard disk drive (hard disk drive, HDD), or a solid-state drive (solid-state drive, SSD); or the memory 1330 may include a combination of the foregoing types of memories. The memory 1330 may be configured to store a group of program code, so that the processor 1320 invokes the program code stored in the memory 1330, to implement the functions of the sending module and/or the obtaining module in the embodiments of this application.

When the program code in the memory 1330 is executed by the processor 1320, the physical host 1300 may perform the method in the foregoing method embodiment 700 or 900.

Figure 14:
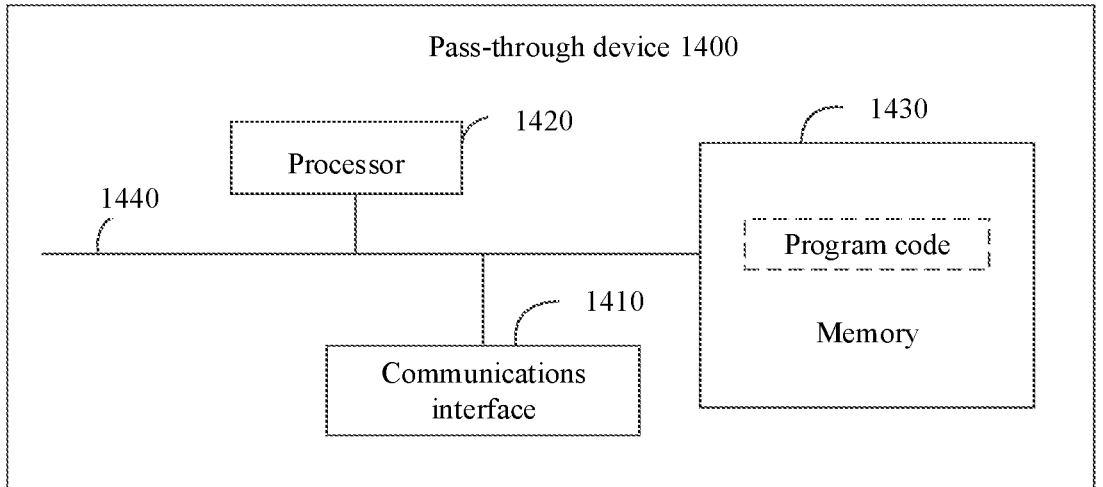
FIG. 14 is a schematic block diagram of a pass-through device according to another embodiment of this application.

FIG. 14 is a schematic block diagram of a pass-through device according to an embodiment of this application. The pass-through device 1400 may include a communications interface 1410, a processor 1420, and a memory 1430.

Optionally, the pass-through device 1400 may further include a bus 1440. The communications interface 1410, the processor 1420, and the memory 1430 may be connected to each other by using the bus 1440. The bus 1440 may be a peripheral component interconnect (peripheral component interconnect, PCI) bus, an extended industry standard architecture (extended industry standard architecture, EISA) bus, or the like. The bus 1440 may be classified into an address bus, a data bus, a control bus, and the like. For ease of representation, only one thick line is used to represent the bus in FIG. 14, but this does not mean that there is only one bus or only one type of bus.

The memory 1430 may be configured to store program code and data of a computer system. Therefore, the memory 1430 may be an internal storage unit of the processor 1420, may be an external storage unit independent of the processor 1420, or may be a part including an internal storage unit of the processor 1420 and an external storage unit independent of the processor 1420.

The processor 1420 may include one or more general-purpose processors, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor 1420 may implement or execute various example logical blocks, modules, and circuits described with reference to content disclosed in this application. The processor may be a combination for implementing a computing function, for example, a combination of a plurality of microprocessors, or a combination of the DSP and a microprocessor. The processor 1420 may be configured to run a program of a processing function in related program code. In other words, the processor 1420 may execute the program code to implement a function of the processing module. For the function of the processing module, refer to related descriptions in the foregoing embodiments.

In a possible implementation, the processor 1420 is configured to run related program code, to implement a function of the source-end virtual pass-through device in the foregoing method embodiments of this application, or implement the method in steps 710 to 730 shown in FIG. 7 of this application, or implement the method in steps 901 to 911 shown in FIG. 10 of this application, and/or implement other steps of the technology described in this application. Details are not described or limited herein in this application.

The communications interface 1410 may be a wired interface (for example, an Ethernet interface) or a wireless interface (for example, a cellular network interface or a wireless local area network interface), and is configured to communicate with another module/device.

The memory 1430 may include a volatile memory (volatile memory), such as a random access memory (random access memory, RAM); or the memory may include a non-volatile memory (non-volatile memory), such as a read-only memory (read-only memory, ROM), a flash memory (flash memory), a hard disk drive (hard disk drive, HDD), or a solid-state drive (solid-state drive, SSD); or the memory 1430 may include a combination of the foregoing types of memories. The memory 1430 may be configured to store a group of program code, so that the processor 1420 invokes the program code stored in the memory 1430, to implement the functions of the communications module and/or the processing module in the embodiments of this application.

When the program code in the memory 1430 is executed by the processor 1420, the pass-through device 1400 may perform the method in the foregoing method embodiment 700 or 900.

Optionally, an embodiment of this application further provides a computer system, including the foregoing physical host and one or more pass-through devices.

Optionally, an embodiment of this application further provides a computer program product, where the computer program product includes computer program code, and when the computer program code is run on a computer, the computer is enabled to perform the methods in the foregoing aspects.

A person of ordinary skill in the art may be aware that, units and algorithm steps in the examples described in combination with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be embodied in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A physical host, comprising a source-end virtual machine and a physical function (PF) driver, wherein the source-end virtual machine is configured to:

send a first instruction to a source-end pass-through device by using the PF driver, wherein the first instruction instructs the source-end pass-through device to record a storage address of dirty page data in the source-end pass-through device, and the dirty page data is data written by the source-end pass-through device to a memory corresponding to the source-end virtual machine in a direct memory access (DMA) manner;

obtain the storage address that is of the dirty page data and that is recorded by the source-end pass-through device, wherein obtaining the storage address that is of the dirty page data and that is recorded by the source-end pass-through device comprises:

sending, by the source-end virtual machine, a dirty page synchronization instruction to the source-end pass-through device by using the PF driver, wherein the dirty page synchronization instruction comprises a first address in a first storage space allocated to the PF driver, and the dirty page synchronization instruction instructs the source-end pass-through device to synchronize the storage address of the dirty page data to a storage location that is in the first storage space and that is indicated by the first address; and reading the storage address of the dirty page data from the first storage space based on the first address; and send, from the source-end virtual machine, to-be-migrated data to a destination-end virtual machine, wherein the to-be-migrated data comprises the dirty page data of the source-end virtual machine.

2. The physical host according to claim 1, wherein the source-end virtual machine is configured to send the first instruction to the PF driver; and wherein the PF driver is configured to send the first instruction to the source-end pass-through device.

3. The physical host according to claim 1, wherein the PF driver is configured to write the first instruction into reserved storage space, wherein the reserved storage space is used by the source-end pass-through device to obtain the first instruction.

4. The physical host according to claim 3, wherein the PF driver is configured to send an address of the reserved storage space to the source-end pass-through device by using a register of the source-end pass-through device.

5. The physical host according to claim 1, wherein the PF driver is configured to write the first instruction into a reserved bit of peripheral component interconnect express (PCIe) configuration space of the source-end pass-through device, wherein the PCIe configuration space is used by the source-end pass-through device to obtain the first instruction.

6. The physical host according to claim 1, wherein the PF driver is configured to write the first instruction into preconfigured PCIe configuration space of the source-end pass-through device, and the preconfigured PCIe configuration space is used by the source-end pass-through device to obtain the first instruction.

7. The physical host according to claim 1, wherein a plurality of virtual pass-through devices run in the source-end pass-through device, and wherein the physical host is configured to:

allocate the first storage space to the PF driver, wherein the first storage space is used to store a storage address that is of dirty page data and that is recorded by each of the plurality of virtual pass-through devices.

8. The physical host according to claim 7, wherein the physical host is configured to:

allocate second storage space to the PF driver, wherein the second storage space stores status information of each of the plurality of virtual pass-through devices, the status information is status information of each virtual pass-through device at a moment at which running stops, and the status information comprises information about a register of each virtual pass-through device and information about a memory descriptor.

9. The physical host according to claim 8, wherein the source-end virtual machine is configured to:

send a save instruction to the source-end pass-through device by using the PF driver, wherein the save instruction comprises a second address in the second storage space, and the save instruction is used to instruct the source-end pass-through device to save the status information to a storage location that is in the second storage space and that is indicated by the second address; and obtain the status information from the storage location that is in the second storage space and that corresponds to the second address.

10. The physical host according to claim 7, wherein the plurality of virtual pass-through devices comprise a first virtual pass-through device and a second virtual pass-through device, and wherein the source-end virtual machine is configured to:

after receiving a feedback instruction that is of a second instruction and that is sent by the PF driver, send a third instruction to the second virtual pass-through device by using the PF driver, wherein the feedback instruction indicates that the PF driver has sent the second instruction to the first virtual pass-through device.

11. A pass-through device, comprising:

at least one processor;

one or more memories are coupled to the at least one processor and store programming instructions, wherein the programming instructions are for execution by the at least one processor, to:

receive a first instruction sent by a source-end virtual machine by using a physical function (PF) driver, wherein the first instruction instructs the pass-through device to record a storage address of dirty page data in the pass-through device, the dirty page data is data written by the pass-through device to a memory corresponding to the source-end virtual machine in a direct memory access (DMA) manner, the PF driver runs in a host operating system of a source-end physical host, and the source-end physical host further comprises the source-end virtual machine running in the host operating system;

record the storage address of the dirty page data according to the first instruction, wherein recording the storage address of the dirty page data according to the first instruction comprises:

receiving, by the pass-through device, a dirty page synchronization instruction from the source-end virtual machine by using the PF driver, wherein the dirty page synchronization instruction comprises a first address in first storage space, the first storage space represents storage space that is allocated to the PF driver and that is used to synchronize the storage address of the dirty page data, and the dirty page synchronization instruction instructs the pass-through device to synchronize the storage address of the dirty page data to a storage location that is in the first storage space and that is indicated by the first address; and synchronizing, based on the dirty page synchronization instruction, the storage address of the dirty page data to the storage location that is in the first storage space and that is indicated by the first address; and send the storage address of the dirty page data to the source-end virtual machine.

12. The pass-through device according to claim 11, wherein the programming instructions are for execution by the at least one processor, to:

receive the first instruction sent by the PF driver, wherein the first instruction is an instruction that is transparently transmitted by the source-end virtual machine to the pass-through device by using the PF driver.

13. The pass-through device according to claim 11, wherein the programming instructions are for execution by the at least one processor, to:

obtain, by the pass-through device, an address of reserved storage space; and obtain, based on the address of the reserved storage space, the first instruction carried in the reserved storage space, wherein the first instruction is an instruction written by the PF driver to the reserved storage space.

14. The pass-through device according to claim 11, wherein the programming instructions are for execution by the at least one processor, to:

obtain the first instruction carried in a reserved bit of peripheral component interconnect express (PCIe) configuration space of the pass-through device, wherein the first instruction is an instruction written by the PF driver to the reserved bit.

15. The pass-through device according to claim 11, wherein the programming instructions are for execution by the at least one processor, to:

obtain the first instruction carried in preconfigured PCIe configuration space of the pass-through device, wherein the first instruction is an instruction written by the PF driver to the preconfigured PCIe configuration space.

16. The pass-through device according to claim 11, wherein a plurality of virtual pass-through devices run on the pass-through device, and the first storage space stores a storage address that is of dirty page data and that is recorded by each of the plurality of virtual pass-through devices.

17. The pass-through device according to claim 11, wherein the programming instructions are for execution by the at least one processor, to:

receive a save instruction sent by the source-end virtual machine by using the PF driver, wherein the save instruction comprises a second address in second storage space, the second storage space represents storage space that is allocated to the PF driver and that stores status information of the pass-through device at a moment at which running stops, the save instruction is used to instruct the pass-through device to save the status information to a storage location that is in the second storage space and that is indicated by the second address, and the status information comprises information about a register of the pass-through device and information about a memory descriptor; and save, according to the save instruction, the status information to the storage location that is in the second storage space and that is indicated by the second address.

18. The pass-through device according to claim 17, wherein a plurality of virtual pass-through devices run on the pass-through device, and the second storage space stores status information of each of the plurality of pass-through devices.

* * * * *